US010764173B2

(12) United States Patent
Zhou et al.

(10) Patent No.: US 10,764,173 B2
(45) Date of Patent: Sep. 1, 2020

(54) ROUTING CONTROL METHOD, DEVICE, AND SYSTEM

(71) Applicant: Huawei Technologies Co., Ltd., Shenzhen (CN)

(72) Inventors: Peng Zhou, Beijing (CN); Yi Xiong, Beijing (CN); Shunwan Zhuang, Beijing (CN); Changjiang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 15/862,918

(22) Filed: Jan. 5, 2018

(65) Prior Publication Data

US 2018/0131604 A1    May 10, 2018

Related U.S. Application Data

(63) Continuation of application No. PCT/CN2015/083410, filed on Jul. 6, 2015.

(51) Int. Cl.
*H04L 12/721* (2013.01)
*H04L 12/715* (2013.01)
(Continued)

(52) U.S. Cl.
CPC .............. *H04L 45/44* (2013.01); *H04L 45/02* (2013.01); *H04L 45/04* (2013.01); *H04L 45/38* (2013.01);
(Continued)

(58) Field of Classification Search
CPC ......... H04L 45/44; H04L 45/04; H04L 45/64; H04L 47/125; H04L 45/02; H04L 45/38; H04L 45/54
See application file for complete search history.

(56) References Cited

U.S. PATENT DOCUMENTS

| 7,925,778 B1* | 4/2011 | Wijnands .............. H04L 12/185 370/389 |
| 2007/0214280 A1* | 9/2007 | Patel ....................... H04L 45/04 709/239 |

(Continued)

FOREIGN PATENT DOCUMENTS

| CN | 101106519 A | 1/2008 |
| CN | 101917414 A | 12/2010 |

(Continued)

OTHER PUBLICATIONS

Marques, P. et al., "Dissemination of Flow Specification Rules," Network Working Group, Request for Comments: 5575, Category: Standards Track, Aug. 2009, 22 pages.

(Continued)

*Primary Examiner* — Christine Ng
(74) *Attorney, Agent, or Firm* — Slater Matsil, LLP

(57) ABSTRACT

A controller, including a processor and a non-transitory computer-readable storage medium storing a program to be executed by the processor for managing a first autonomous system (AS), the program including instructions to receive a first Border Gateway Protocol (BGP) routing message, determine a destination node, the destination node belonging to the first AS, determine, according to a node that sends the first BGP routing message, whether to perform incoming-traffic adjustment and control, allocate a source node from a second AS directly connected to the first AS, obtain a preferred path between the source and destination nodes according to a network topology, determine a first BR and a second BR on the preferred path, and send a routing control message to a specified BR belonging to the first AS instructing the specified BR to use the first BR as a next hop for packet forwarding of the second BR.

24 Claims, 11 Drawing Sheets

(51) Int. Cl.
*H04L 12/751* (2013.01)
*H04L 12/803* (2013.01)
*H04L 12/741* (2013.01)

(52) U.S. Cl.
CPC ............ *H04L 45/64* (2013.01); *H04L 47/125* (2013.01); *H04L 45/54* (2013.01)

(56) References Cited

U.S. PATENT DOCUMENTS

| | | | | |
|---|---|---|---|---|
| 2008/0013551 | A1* | 1/2008 | Scholl | H04L 45/04 370/401 |
| 2011/0235545 | A1 | 9/2011 | Subramanian et al. | |
| 2012/0144066 | A1* | 6/2012 | Medved | H04L 45/02 709/242 |
| 2013/0031271 | A1* | 1/2013 | Bosch | H04W 40/36 709/245 |
| 2015/0304206 | A1* | 10/2015 | Filsfils | H04L 45/04 709/238 |

FOREIGN PATENT DOCUMENTS

| | | |
|---|---|---|
| CN | 101958829 A | 1/2011 |
| CN | 104301466 A | 5/2015 |

OTHER PUBLICATIONS

Ottaro, J. et al., "BGP Flow-Spec Redirect to IP Action draft-ietf-idr-flowspec-redirect-ip-01.txt," IDR Working Group, Internet-Draft, Intended Status: Standards Track, Apr. 16, 2014, 8 pages.

Gupta, A. et al., "SDX: A Software Defined Internet Exchange," Computer Communication Review, ACM, New York, NY, vol. 44, No. 4, XP058064791, Aug. 17, 2014, 12 pages.

Bennesby, R. et al., "An Inter-AS Routing Component for Software-Defined Networks," XP032448644, 2012 IEEE Network Operations and Management Symposium (NOMS), Apr. 16, 2012, 8 pages.

* cited by examiner

| Match type (a value is 1: rejection) |  |
|---|---|
| Sub-TLV quantity Number of Sub-TLVs (a value is 1) | |
| Type (a value is 1 or 2) | Length Length |
| Neighbor local device identifier | |
| Neighbor peer device identifier | |
| Action type | |
| Action length | |
| Autonomous-system quantity | |

FIG. 4a

| Match type (a value is 0: permission) | |
|---|---|
| Sub-TLV quantity Number of Sub-TLVs | |
| Type (a value is 1 or 2) | Length |
| Neighbor-1 local device identifier | |
| Neighbor-1 peer device identifier | |
| ... | |
| Type (a value is 1 or 2) | Length |
| Neighbor-n local device identifier | |
| Neighbor-n peer device identifier | |
| Action type | |
| Action length | |
| Autonomous-system quantity | |

FIG. 4b

| Match type Match Type (a value is 0: permission) ||
|---|---|
| Sub-TLV quantity Number of Sub-TLVs ||
| Type Type (a value is 1 or 2) | Length Length |
| Neighbor local device identifier ||
| Neighbor peer device identifier ||
| Action type Action Type (a value is 1) ||
| Action length Action Length (a value is 0) ||
FIG. 12
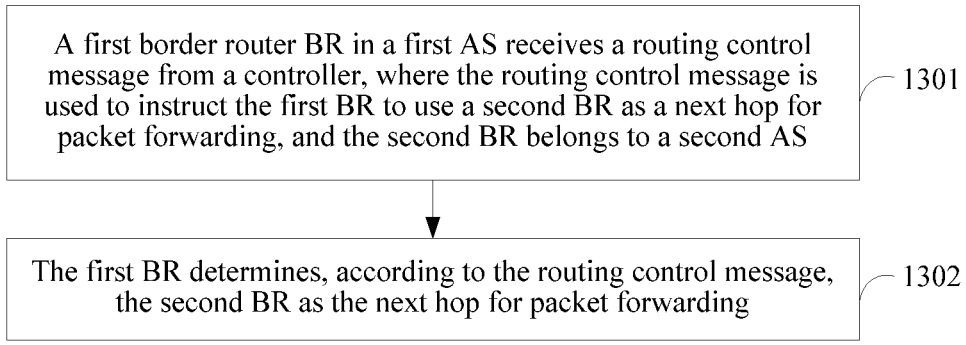
FIG. 13
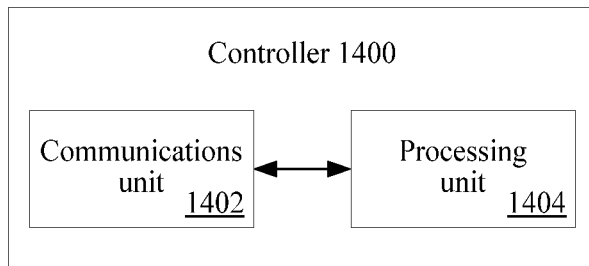
FIG. 14

ROUTING CONTROL METHOD, DEVICE, AND SYSTEM

CROSS-REFERENCE TO RELATED APPLICATIONS

This application is a continuation of International Application No. PCT/CN2015/083410, filed on Jul. 6, 2015, the disclosure of which is hereby incorporated by reference in its entirety.

TECHNICAL FIELD

Embodiments of the application relate to the communications field, and in particular, to a routing control method, a device, and a system.

BACKGROUND

Generally, an autonomous system (AS) of an operator includes the following three types of devices: a provider edge (PE) device, a border router (BR), and a provider (P) device. The PE device is a network-side edge device of the autonomous system, is connected to a customer edge (CE) device, and is configured to access a user service. The BR is a border router of the autonomous system, and is configured to advertise a route between ASs.

The Border Gateway Protocol (BGP) is generally used for routing control between ASs of different operators. Different ASs are connected to each other by using a BR. When traffic needs to be adjusted and controlled (for example, some BRs or links are overloaded and congested, whereas some BRs or links are underloaded and idle), an operator generally needs to manually analyze traffic distribution and configure a routing policy, to adjust and control traffic flowing into and out of an AS managed by the operator. In addition, such manual configuration needs to be performed one by one on a related BR of the AS of the operator. This is laborious and time consuming.

SUMMARY

A routing control method and an apparatus provided in embodiments of the application help an operator to automatically adjust and control data traffic flowing into and out of an AS managed by the operator.

For this purpose, the embodiments of the application provide the following technical solutions.

According to a first aspect, a routing control method is provided, where the method includes receiving, by a controller, a first Border Gateway Protocol (BGP) routing message, where the controller is configured to manage a first autonomous system (AS), determining, by the controller according to a node that sends the first BGP routing message to the controller, whether to perform incoming-traffic adjustment and control, if determining to perform incoming-traffic adjustment and control, determining, by the controller, a destination node according to the first BGP routing message, and allocating a source node from a second AS, where the destination node belongs to the first AS, and the second AS is at least one AS that is directly connected to the first AS, obtaining, by the controller, a preferred path between the source node and the destination node by using a network topology, where the network topology includes an intra-domain topology of the first AS and an inter-domain topology between BRs of the first AS and the second AS, determining, by the controller, a first BR and a second BR on the preferred path according to the preferred path, where the first BR belongs to the first AS, and the second BR belongs to the second AS, and sending, by the controller, a routing control message to a specified BR, where the specified BR belongs to the first AS, and the routing control message is used to instruct the specified BR to use, when advertising a second BGP routing message to the second AS, the first BR as a next hop for packet forwarding of the second BR.

With reference to the first aspect, in a first possible implementation of the first aspect, the determining, according to a node that sends the first BGP routing message to the controller, to perform incoming-traffic adjustment and control includes performing incoming-traffic adjustment and control if the controller determines that the node that sends the first BGP routing message to the controller is a border network device of the first AS, where the border network device of the first AS is a BR device or a provider edge (PE) device.

With reference to the first aspect, in a second possible implementation of the first aspect, the determining, according to a node that sends the first BGP routing message to the controller, whether to perform incoming-traffic adjustment and control includes searching, by the controller, a first configuration information table by using the node that sends the first BGP routing message to the controller, as a first match item, to obtain an operation corresponding to the first match item, where the obtained operation is performing incoming-traffic adjustment and control.

With reference to the first aspect, in a third possible implementation of the first aspect, the determining, according to a node that sends the first BGP routing message to the controller, whether to perform incoming-traffic adjustment and control includes obtaining, by the controller, a first destination prefix according to the first BGP routing message, and searching, by the controller, a second configuration information table by using the node that sends the first BGP routing message to the controller and the first destination prefix as a second match item, to obtain an operation corresponding to the second match item, where the obtained operation is performing incoming-traffic adjustment and control.

With reference to any one of the first aspect, or the first to the third possible implementations of the first aspect, in a fourth possible implementation of the first aspect, the determining, by the controller, a destination node according to the first BGP routing message includes determining, by the controller, whether at least two first BGP routing messages are received, and if determining that at least two first BGP routing messages are received, setting, by the controller, a virtual node in the first AS, and determining the virtual node as the destination node, and correspondingly, the intra-domain topology further includes a link between the node that sends the first BGP routing message to the controller and the destination node.

With reference to any one of the first aspect, or the first to the third possible implementations of the first aspect, in a fifth possible implementation of the first aspect, the determining, by the controller, a destination node according to the first BGP routing message includes setting, by the controller, a virtual node in the first AS, and determining the virtual node as the destination node. Correspondingly, the intra-domain topology further includes a link between the border network device of the first AS and the destination node, and the obtaining, by the controller, a preferred path between the source node and the destination node by using a network topology includes: obtaining, by the controller, a first affinity attribute constraint condition according to a link between the node that sends the first BGP routing message to the controller and the destination node; and obtaining, by the controller, the preferred path by using the network topology and the first affinity attribute constraint condition.

With reference to any one of the first aspect, or the first to the fifth possible implementations of the first aspect, in a sixth possible implementation of the first aspect, the allocating a source node from a second AS includes selecting, by the controller, one node from a border router or a virtual node in the second AS, as the source node.

With reference to any one of the first aspect, or the first to the fifth possible implementations of the first aspect, in a seventh possible implementation of the first aspect, the allocating a source node from a second AS includes searching, by the controller, a third configuration information table by using the node that sends the first BGP routing message to the controller, as a first match item, to obtain a source node corresponding to the first match item, as the source node, or obtaining, by the controller, a first destination prefix according to the first BGP routing message, and searching, by the controller, a fourth configuration information table by using the node that sends the first BGP routing message to the controller and the first destination prefix as a second match item, to obtain a source node corresponding to the second match item, as the source node.

With reference to any one of the first aspect, or the first to the seventh possible implementations of the first aspect, in an eighth possible implementation of the first aspect, the source node is a BR that is in the second AS and that is directly connected to the first AS, and the inter-domain topology between the BRs of the first AS and the second AS includes an inter-domain topology between a BR of the first AS and a BR of the second AS.

With reference to any one of the first aspect, or the first to the seventh possible implementations of the first aspect, in a ninth possible implementation of the first aspect, the source node is a virtual node that is set in the second AS, and the inter-domain topology between the BRs of the first AS and the second AS includes an inter-domain topology between a BR of the first AS and a BR of the second AS, and a topology between the source node and the BR of the second AS.

With reference to the eighth or the ninth possible implementation of the first aspect, in a tenth possible implementation of the first aspect, a manner in which the controller obtains the inter-domain topology is obtaining, by the controller, a direct route of the BR of the first AS by using an Interior Gateway Protocol IGP routing message, determining, by the controller, whether the obtained direct route and a link identifier are stored in a match item of a link information configuration table, and if determining that the obtained direct route and the link identifier are stored in the match item of the link information configuration table, establishing, by the controller according to the link identifier, the inter-domain topology between the first AS and an AS that is directly connected to the first AS.

With reference to any one of the first aspect, or the first to the tenth possible implementations of the first aspect, in an eleventh possible implementation of the first aspect, the routing control message includes a neighbor pair constituted by an identifier of the first BR and an identifier of the second BR, and an operation manner, and the operation manner instructs the specified BR to perform matching, when advertising the second BGP routing message to a destination BR in the second AS, between an identifier of the specified BR and an identifier of the destination BR and the neighbor pair, and if the matching succeeds, not to perform an operation of increasing an AS quantity in an AS-path attribute value carried in the second BGP routing message, or if the matching fails, to perform an operation of increasing an AS quantity in an AS-path attribute value, where the destination BR is a BR in the second AS.

With reference to the eleventh possible implementation of the first aspect, in a twelfth possible implementation of the first aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and a sub-TLV field, where the match type field carries a reject value, the sub-type length value sub-TLV quantity field indicates that a quantity of sub-TLVs carried in the match field is 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries the identifier of the first BR, and the neighbor peer device identifier field carries the identifier of the second BR; and the action field includes an action type field, an action length field, and an action value field, where the action type field indicates to perform the operation of increasing the AS quantity in the AS-path attribute value, the action length field indicates a length of the action field or a length of the action value field, and the action value field carries the AS quantity.

With reference to any one of the first aspect, or the first to the tenth possible implementations of the first aspect, in a thirteenth possible implementation of the first aspect, the routing control message includes at least one neighbor pair and an operation manner, the at least one neighbor pair does not include a neighbor pair constituted by an identifier of the first BR and an identifier of the second BR, and the operation manner instructs the specified BR to perform matching, when advertising the second BGP routing message to a destination BR in the second AS, between an identifier of the specified BR and an identifier of the destination BR and each of the at least one neighbor pair, and if the matching succeeds, to perform an operation of increasing an AS quantity in an AS-path attribute value, or if the matching fails, not to perform an operation of increasing an AS quantity in an AS-path attribute value, where the destination BR is a BR in the second AS.

With reference to the thirteenth possible implementation of the first aspect, in a fourteenth possible implementation of the first aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and at least one sub-TLV field, where the match type field carries a permit value, the sub-type length value sub-TLV quantity field indicates that a quantity of sub-TLVs carried in the match field is greater than or equal to 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries an identifier of a BR in the first AS, other than the identifier of the first BR, and the neighbor peer device identifier field carries an identifier of a BR in the second AS, other than the identifier of the second BR; and the action field includes an action type field, an action length field, and an action value field, where the action type field indicates to perform the operation of increasing the AS quantity in the AS-path attribute value, the action length field indicates a length of the action field or a length of the action value field, and the action value field carries the AS quantity.

According to a second aspect, a routing control method is provided, where the method includes receiving, by a specified border router BR in a first AS, a routing control message from a controller, where the routing control message is used to instruct the specified BR to use, when advertising a second BGP routing message to a second AS, a first BR as a next hop for packet forwarding of a second BR, the first BR belongs to the first AS, the second BR belongs to the second AS, and the controller is configured to manage the first autonomous system (AS), and processing, by the specified BR according to the routing control message, the second BGP routing message advertised to the second AS.

With reference to the second aspect, in a first possible implementation of the second aspect, the routing control message includes a neighbor pair constituted by an identifier of the first BR and an identifier of the second BR, and an operation manner, and the operation manner instructs the specified BR to perform matching, when advertising the second BGP routing message to a destination BR in the second AS, between an identifier of the specified BR and an identifier of the destination BR and the neighbor pair, and if the matching succeeds, not to perform an operation of increasing an AS quantity in an AS-path attribute value carried in the second BGP routing message, or if the matching fails, to perform an operation of increasing an AS quantity in an AS-path attribute value, where the destination BR is a BR in the second AS; and correspondingly, the processing, by the specified BR according to the routing control message, the BGP routing message advertised to the second AS includes performing matching, by the specified BR, between the identifier of the specified BR and the identifier of the destination BR and the neighbor pair when the specified BR advertises the BGP routing message to the destination BR in the second AS, and if the matching succeeds, not performing the operation of increasing the AS quantity in the AS-path attribute value carried in the BGP routing message, or if the matching fails, performing the operation of increasing the AS quantity in the AS-path attribute value.

With reference to the first possible implementation of the second aspect, in a second possible implementation of the second aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and a sub-TLV field, where the match type field carries a reject value, the sub-type length value sub-TLV quantity field indicates that a quantity of sub-TLVs carried in the match field is 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries the identifier of the first BR, and the neighbor peer device identifier field carries the identifier of the second BR, and the action field includes an action type field, an action length field, and an action value field, where the action type field indicates to perform the operation of increasing the AS quantity in the AS-path, the action length field indicates a length of the action field or a length of the action value field, and the action value field carries the AS quantity.

With reference to the second aspect, in a third possible implementation of the second aspect, the routing control message includes at least one neighbor pair and an operation manner, the at least one neighbor pair does not include a neighbor pair constituted by an identifier of the first BR and an identifier of the second BR, and the operation manner instructs the specified BR to perform matching, when advertising the second BGP routing message to a destination BR in the second AS, between an identifier of the specified BR and an identifier of the destination BR and each of the at least one neighbor pair, and if the matching succeeds, to perform an operation of increasing an AS quantity in an AS-path attribute value, or if the matching fails, not to perform an operation of increasing an AS quantity in an AS-path attribute value, where the destination BR is a BR in the second AS, and correspondingly, the processing, by the specified BR according to the routing control message, the BGP routing message advertised to the second AS includes performing matching, by the specified BR, between the identifier of the specified BR and the identifier of the destination BR and each of the at least one neighbor pair when the specified BR advertises the BGP routing message to the destination BR in the second AS, and if the matching succeeds, performing the operation of increasing the AS quantity in the AS-path attribute value, or if the matching fails, not performing the operation of increasing the AS quantity in the AS-path attribute value.

With reference to the third possible implementation of the second aspect, in a fourth possible implementation of the second aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and at least one sub-TLV field, where the match type field carries a permit value, the sub-type length value sub-TLV quantity field indicates that a quantity of sub-TLVs carried in the match field is greater than or equal to 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries an identifier of a BR in the first AS, other than the identifier of the first BR, and the neighbor peer device identifier field carries an identifier of a BR in the second AS, other than the identifier of the second BR, and the action field includes an action type field, an action length field, and an action value field, where the action type field indicates to perform the operation of increasing the AS quantity in the AS-path, the action length field indicates a length of the action field or a length of the action value field, and the action value field carries the AS quantity.

According to a third aspect, a controller is provided, where the controller is configured to manage a first autonomous system (AS), and the controller includes a communications unit, configured to receive a first Border Gateway Protocol (BGP) routing message, and a processing unit, configured to determine a destination node according to the first BGP routing message, where the destination node belongs to the first AS, where the processing unit is further configured to determine, according to a node that sends the first BGP routing message to the controller, whether to perform incoming-traffic adjustment and control, if determining to perform incoming-traffic adjustment and control, the processing unit is further configured to allocate a source node from a second AS, where the second AS is at least one AS that is directly connected to the first AS, the processing unit is further configured to obtain a preferred path between the source node and the destination node by using a network topology, where the network topology includes an intra-domain topology of the first AS and an inter-domain topology between BRs of the first AS and the second AS, the processing unit is further configured to determine a first BR and a second BR on the preferred path according to the preferred path, where the first BR belongs to the first AS, and the second BR belongs to the second AS, and the communications unit is further configured to send a routing control message to a specified BR, where the specified BR belongs to the first AS, and the routing control message is used to instruct the specified BR to use, when advertising a second BGP routing message to the second AS, the first BR as a next hop for packet forwarding of the second BR.

With reference to the third aspect, in a first possible implementation of the third aspect, the determining, according to a node that sends the first BGP routing message to the controller, to perform incoming-traffic adjustment and control includes performing, by the processing unit, incoming-traffic adjustment and control if determining that the node that sends the first BGP routing message to the controller is a border network device of the first AS, where the border network device of the first AS is a BR device or a provider edge PE device.

With reference to the third aspect, in a second possible implementation of the third aspect, the determining, according to a node that sends the first BGP routing message to the controller, whether to perform incoming-traffic adjustment and control includes searching, by the processing unit, a first configuration information table by using the node that sends the first BGP routing message to the controller, as a first match item, to obtain an operation corresponding to the first match item, where the obtained operation is performing incoming-traffic adjustment and control.

With reference to the third aspect, in a third possible implementation of the third aspect, the determining, according to a node that sends the first BGP routing message to the controller, whether to perform incoming-traffic adjustment and control includes obtaining, by the processing unit, a first destination prefix according to the first BGP routing message, and searching, by the processing unit, a second configuration information table by using the node that sends the first BGP routing message to the controller and the first destination prefix as a second match item, to obtain an operation corresponding to the second match item, where the obtained operation is performing incoming-traffic adjustment and control.

With reference to any one of the third aspect, or the first to the third possible implementations of the third aspect, in a fourth possible implementation of the third aspect, the determining, by the processing unit, a destination node according to the first BGP routing message includes determining, by the processing unit, whether at least two first BGP routing messages are received, and if determining that at least two first BGP routing messages are received, setting, by the processing unit, a virtual node in the first AS, and determining the virtual node as the destination node, and correspondingly, the intra-domain topology further includes a link between the node that sends the first BGP routing message to the controller and the destination node.

With reference to any one of the third aspect, or the first to the third possible implementations of the third aspect, in a fifth possible implementation of the third aspect, the determining, by the processing unit, a destination node according to the first BGP routing message includes setting, by the processing unit, a virtual node in the first AS, and determining the virtual node as the destination node, correspondingly, the intra-domain topology further includes a link between the border network device of the first AS and the destination node, and the obtaining, by the processing unit, a preferred path between the source node and the destination node by using a network topology includes: obtaining, by the processing unit, a first affinity attribute constraint condition according to a link between the node that sends the first BGP routing message to the controller and the destination node; and obtaining, by the controller, the preferred path by using the network topology and the first affinity attribute constraint condition.

With reference to any one of the third aspect, or the first to the fifth possible implementations of the third aspect, in a sixth possible implementation of the third aspect, the allocating a source node from a second AS includes determining, by the processing unit, one AS that is directly connected to the first AS, as the second AS, and allocating, by the processing unit, the source node from the second AS.

With reference to any one of the third aspect, or the first to the fifth possible implementations of the third aspect, in a seventh possible implementation of the third aspect, the allocating a source node from a second AS includes searching, by the processing unit, a third configuration information table by using the node that sends the first BGP routing message to the controller, as a first match item, to obtain a source node corresponding to the first match item, as the source node, or obtaining, by the processing unit, a first destination prefix according to the first BGP routing message, and searching, by the processing unit, a fourth configuration information table by using the node that sends the first BGP routing message to the controller and the first destination prefix as a second match item, to obtain a source node corresponding to the second match item, as the source node.

With reference to any one of the third aspect, or the first to the seventh possible implementations of the third aspect, in an eighth possible implementation of the third aspect, the source node is a BR that is in the second AS and that is directly connected to the first AS, and the inter-domain topology between the BRs of the first AS and the second AS includes an inter-domain topology between a BR of the first AS and a BR of the second AS.

With reference to any one of the third aspect, or the first to the seventh possible implementations of the third aspect, in a ninth possible implementation of the third aspect, the source node is a virtual node that is set in the second AS, and the inter-domain topology between the BRs of the first AS and the second AS includes an inter-domain topology between a BR of the first AS and a BR of the second AS, and a topology between the source node and the BR of the second AS.

With reference to the eighth or the ninth possible implementation of the third aspect, in a tenth possible implementation of the third aspect, a manner in which the processor obtains the inter-domain topology is obtaining, by the processing unit, a direct route of the BR of the first AS by using an Interior Gateway Protocol IGP routing message, determining, by the processing unit, whether the obtained direct route and a link identifier are stored in a match item of a link information configuration table, and if determining that the obtained direct route and the link identifier are stored in the match item of the link information configuration table, establishing, by the processing unit according to the link identifier, the inter-domain topology between the first AS and an AS that is directly connected to the first AS.

With reference to any one of the third aspect, or the first to the tenth possible implementations of the third aspect, in an eleventh possible implementation of the third aspect, the routing control message includes a neighbor pair constituted by an identifier of the first BR and an identifier of the second BR, and an operation manner, and the operation manner instructs the specified BR to perform matching, when advertising the second BGP routing message to a destination BR in the second AS, between an identifier of the specified BR and an identifier of the destination BR and the neighbor pair, and if the matching succeeds, not to perform an operation of increasing an AS quantity in an AS-path attribute value carried in the second BGP routing message, or if the matching fails, to perform an operation of increasing an AS quantity in an AS-path attribute value, where the destination BR is a BR in the second AS.

With reference to the eleventh possible implementation of the third aspect, in a twelfth possible implementation of the third aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and a sub-TLV field, where the match type field carries a reject value, the sub-type length value sub-TLV quantity field indicates that a quantity of sub-TLVs carried in the match field is 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries the identifier of the first BR, and the neighbor peer device identifier field carries the identifier of the second BR, and the action field includes an action type field, an action length field, and an action value field, where the action type field indicates to perform the operation of increasing the AS quantity in the AS-path, the action length field indicates a length of the action field or a length of the action value field, and the action value field carries the AS quantity.

With reference to any one of the third aspect, or the first to the tenth possible implementations of the third aspect, in a thirteenth possible implementation of the third aspect, the routing control message includes at least one neighbor pair and an operation manner, the at least one neighbor pair does not include a neighbor pair constituted by an identifier of the first BR and an identifier of the second BR, and the operation manner instructs the specified BR to perform matching, when advertising the second BGP routing message to a destination BR in the second AS, between an identifier of the specified BR and an identifier of the destination BR and each of the at least one neighbor pair, and if the matching succeeds, to perform an operation of increasing an AS quantity in an AS-path attribute value, or if the matching fails, not to perform an operation of increasing an AS quantity in an AS-path attribute value, where the destination BR is a BR in the second AS.

With reference to the thirteenth possible implementation of the third aspect, in a fourteenth possible implementation of the third aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and at least one sub-TLV field, where the match type field carries a permit value, the sub-type length value sub-TLV quantity field indicates that a quantity of sub-TLVs carried in the match field is greater than or equal to 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries an identifier of a BR in the first AS, other than the identifier of the first BR, and the neighbor peer device identifier field carries an identifier of a BR in the second AS, other than the identifier of the second BR, and the action field includes an action type field, an action length field, and an action value field, where the action type field indicates to perform the operation of increasing the AS quantity in the AS-path, the action length field indicates a length of the action field or a length of the action value field, and the action value field carries the AS quantity.

According to a fourth aspect, a border router is provided, where the border router is used as a specified border router BR, the specified BR belongs to a first autonomous system AS, and the specified BR includes a communications unit, configured to receive a routing control message from a controller, where the routing control message is used to instruct the specified BR to use, when advertising a BGP routing message to a second AS, a first BR as a next hop for packet forwarding of a second BR, the first BR belongs to the first AS, the second BR belongs to the second AS, and the controller is configured to manage the first AS, and a processing unit, configured to process, according to the routing control message, the BGP routing message advertised to the second AS.

With reference to the fourth aspect, in a first possible implementation of the fourth aspect, the routing control message includes a neighbor pair constituted by an identifier of the first BR and an identifier of the second BR, and an operation manner, and the operation manner instructs the specified BR to perform matching, when advertising the BGP routing message to a destination BR in the second AS, between an identifier of the specified BR and an identifier of the destination BR and the neighbor pair, and if the matching succeeds, not to perform an operation of increasing an AS quantity in an AS-path attribute value carried in the BGP routing message, or if the matching fails, to perform an operation of increasing an AS quantity in an AS-path attribute value, where the destination BR is a BR in the second AS, and correspondingly, the processing, by the processing unit according to the routing control message, the BGP routing message advertised to the second AS includes performing matching, by the processing unit, between the identifier of the specified BR and the identifier of the destination BR and the neighbor pair when the communications unit advertises the BGP routing message to the destination BR in the second AS, and if the matching succeeds, not performing the operation of increasing the AS quantity in the AS-path attribute value carried in the BGP routing message, or if the matching fails, performing the operation of increasing the AS quantity in the AS-path attribute value, where the destination BR is the BR in the second AS.

With reference to the first possible implementation of the fourth aspect, in a second possible implementation of the fourth aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and a sub-TLV field, where the match type field carries a reject value, the sub-type length value sub-TLV quantity field indicates that a quantity of sub-TLVs carried in the match field is 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries the identifier of the first BR, and the neighbor peer device identifier field carries the identifier of the second BR, and the action field includes an action type field, an action length field, and an action value field, where the action type field indicates to perform the operation of increasing the AS quantity in the AS-path, the action length field indicates a length of the action field or a length of the action value field, and the action value field carries the AS quantity.

With reference to the fourth aspect, in a third possible implementation of the fourth aspect, the routing control message includes at least one neighbor pair and an operation manner, the at least one neighbor pair does not include a neighbor pair constituted by an identifier of the first BR and an identifier of the second BR, and the operation manner instructs the specified BR to perform matching, when advertising the BGP routing message to a destination BR in the second AS, between an identifier of the specified BR and an identifier of the destination BR and each of the at least one neighbor pair, and if the matching succeeds, to perform an operation of increasing an AS quantity in an AS-path attribute value, or if the matching fails, not to perform an operation of increasing an AS quantity in an AS-path attribute value, where the destination BR is a BR in the second AS, and correspondingly, the processing, by the processing unit according to the routing control message, the BGP routing message advertised to the second AS includes performing matching, by the processing unit, between the identifier of the specified BR and the identifier of the destination BR and each of the at least one neighbor pair when the communications unit advertises the BGP routing message to the destination BR in the second AS, and if the matching succeeds, performing the operation of increasing the AS quantity in the AS-path attribute value, or if the matching fails, not performing the operation of increasing the AS quantity in the AS-path attribute value, where the destination BR is the BR in the second AS.

With reference to the third possible implementation of the fourth aspect, in a fourth possible implementation of the fourth aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and at least one sub-TLV field, where the match type field carries a permit value, the sub-type length value sub-TLV quantity field indicates that a quantity of sub-TLVs carried in the match field is greater than or equal to 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries an identifier of a BR in the first AS, other than the identifier of the first BR, and the neighbor peer device identifier field carries an identifier of a BR in the second AS, other than the identifier of the second BR, and the action field includes an action type field, an action length field, and an action value field, where the action type field indicates to perform the operation of increasing the AS quantity in the AS-path, the action length field indicates a length of the action field or a length of the action value field, and the action value field carries the AS quantity.

According to a fifth aspect, a network system is provided, where the network system includes a controller and a border router BR, the controller is any controller according to the third aspect, and the BR is any specified BR according to the fourth aspect.

According to a sixth aspect, a routing control method is provided, where the method includes receiving, by a controller, a Border Gateway Protocol BGP routing message, where the controller is configured to manage a first autonomous system AS, determining, by the controller according to a node that sends the BGP routing message to the controller, whether to perform outgoing-traffic adjustment and control, if determining to perform outgoing-traffic adjustment and control, determining, by the controller, a destination node according to the BGP routing message, and allocating a source node from the first AS, where the destination node belongs to a second AS, and the second AS is at least one AS that is directly connected to the first AS, obtaining, by the controller, a preferred path between the source node and the destination node by using a network topology, where the network topology includes an intra-domain topology of the first AS and an inter-domain topology between BRs of the first AS and the second AS, determining, by the controller, a first BR and a second BR on the preferred path according to the preferred path, where the first BR belongs to the first AS, and the second BR belongs to the second AS, and sending, by the controller, a routing control message to the first BR, where the routing control message is used to instruct the first BR to use the second BR as a next hop for packet forwarding.

With reference to the sixth aspect, in a first possible implementation of the sixth aspect, the determining, according to a node that sends the BGP routing message to the controller, whether to perform outgoing-traffic adjustment and control includes performing outgoing-traffic adjustment and control if the controller determines that the node that sends the BGP routing message to the controller is a BR of the first AS.

With reference to the sixth aspect, in a second possible implementation of the sixth aspect, the determining, according to a node that sends the BGP routing message to the controller, whether to perform outgoing-traffic adjustment and control includes searching, by the controller, a first configuration information table by using the node that sends the BGP routing message to the controller, as a first match item, to obtain an operation corresponding to the first match item, where the obtained operation is performing outgoing-traffic adjustment and control.

With reference to the sixth aspect, in a third possible implementation of the sixth aspect, the determining, according to a node that sends the BGP routing message to the controller, whether to perform outgoing-traffic adjustment and control includes obtaining, by the controller, a first destination prefix according to the BGP routing message, and searching, by the controller, a second configuration information table by using the node that sends the BGP routing message to the controller and the first destination prefix as a second match item, to obtain an operation corresponding to the second match item, where the obtained operation is performing outgoing-traffic adjustment and control.

With reference to any one of the sixth aspect, or the first to the third possible implementations of the sixth aspect, in a fourth possible implementation of the sixth aspect, the allocating a source node from the first AS includes searching, by the controller, a first configuration information table by using the node that sends the first BGP routing message to the controller, as a first match item, to obtain a source node corresponding to the first match item, as the source node, or obtaining, by the controller, a first destination prefix according to the first BGP routing message, and searching, by the controller, a second configuration information table by using the node that sends the first BGP routing message to the controller and the first destination prefix as a second match item, to obtain a source node corresponding to the second match item, as the source node.

With reference to any one of the sixth aspect, or the first to the fourth possible implementations of the sixth aspect, in a fifth possible implementation of the sixth aspect, the destination node is a BR in the second AS, and the inter-domain topology between the BRs of the first AS and the second AS includes an inter-domain topology between a BR of the first AS and a BR of the second AS.

With reference to any one of the sixth aspect, or the first to the fourth possible implementations of the sixth aspect, in a sixth possible implementation of the sixth aspect, the destination node is a virtual node that is set in the second AS, and the inter-domain topology between the BRs of the first AS and the second AS includes an inter-domain topology between a BR of the first AS and a BR of the second AS, and a topology between the destination node and the BR of the second AS.

With reference to the fifth or the sixth possible implementation of the sixth aspect, in a seventh possible implementation of the sixth aspect, a manner in which the controller obtains the inter-domain topology is establishing, by the controller, a link between a BR that is identified by a next-hop field included in the BGP routing message and the node that sends the BGP routing message to the controller, to obtain the inter-domain topology, where the BR identified by the next-hop field belongs to the second AS, or establishing, by the controller, a link between a BR that is identified by a community attribute field included in the BGP routing message and the node that sends the BGP routing message to the controller, to obtain the inter-domain topology, where the BR identified by the community attribute field belongs to the second AS.

With reference to the fifth or the sixth possible implementation of the sixth aspect, in an eighth possible implementation of the sixth aspect, a manner in which the controller obtains the inter-domain topology is obtaining, by the controller, a direct route of the BR of the first AS by using an Interior Gateway Protocol IGP routing message, determining, by the controller, whether the obtained direct route and a link identifier are stored in a match item of a link information configuration table, and if determining that the obtained direct route and the link identifier are stored in the match item of the link information configuration table, establishing, by the controller, the inter-domain topology between the first AS and the second AS according to the link identifier, and correspondingly, the obtaining, by the controller, a preferred path between the source node and the destination node by using a network topology includes: obtaining, by the controller, an affinity attribute constraint condition according to a link between the node that sends the BGP routing message to the controller and the BR of the second AS; and obtaining, by the controller, the preferred path by using the network topology and the affinity attribute constraint condition.

With reference to any one of the sixth aspect, or the first to the eighth possible implementations of the sixth aspect, in a ninth possible implementation of the sixth aspect, the routing control message includes a destination prefix, an identifier of the second BR, and an operation manner, the operation manner instructs the first BR to use the second BR as a next hop for routing to the destination prefix, and the destination prefix is obtained from the BGP routing message.

With reference to the ninth possible implementation of the sixth aspect, in a tenth possible implementation of the sixth aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and a sub-TLV field, where the match type field carries a permit value, the sub-type length value sub-TLV quantity field indicates that a quantity of sub-TLVs carried in the match field is 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries an identifier of the first BR, and the neighbor peer device identifier field carries the identifier of the second BR, the action field includes an action type field and an action length field, where the action type field indicates to perform a preferred-routing operation, and the action length field indicates a length of the action field or a length of the action value field, and the BGP policy attribute instructs the first BR to perform matching between the identifier of the first BR and the neighbor local device identifier field in the neighbor pair field, and if the matching succeeds, to perform an operation of using the second BR as the next hop for routing to the destination prefix.

According to a seventh aspect, a routing control method is provided, where the method includes receiving, by a first border router BR in a first AS, a routing control message from a controller, where the routing control message is used to instruct the first BR to use a second BR as a next hop for packet forwarding, and the second BR belongs to a second AS, and determining, by the first BR according to the routing control message, the second BR as the next hop for packet forwarding.

With reference to the seventh aspect, in a first possible implementation of the seventh aspect, the routing control message includes a destination prefix, an identifier of the second BR, and an operation manner, the operation manner instructs the first BR to use the second BR as a next hop for routing to the destination prefix, and the destination prefix is obtained from a BGP routing message.

With reference to the first possible implementation of the seventh aspect, in a second possible implementation of the seventh aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and a sub-TLV field, where the match type field carries a permit value, the sub-type length value sub-TLV quantity field indicates that a quantity of sub-TLVs carried in the match field is 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries an identifier of the first BR, and the neighbor peer device identifier field carries the identifier of the second BR, the action field includes an action type field and an action length field, where the action type field indicates to perform a preferred-routing operation, and the action length field indicates a length of the action field or a length of the action value field, and the BGP policy attribute instructs the first BR to perform matching between the identifier of the first BR and the neighbor local device identifier field in the neighbor pair field, and if the matching succeeds, to perform an operation of using the second BR as the next hop for routing to the destination prefix.

According to an eighth aspect, a controller is provided, where the controller is configured to manage a first autonomous system AS, and the controller includes a communications unit, configured to receive a Border Gateway Protocol BGP routing message, and a processing unit, configured to determine, according to a node that sends the BGP routing message to the controller, whether to perform outgoing-traffic adjustment and control, where if determining to perform outgoing-traffic adjustment and control, the processing unit is further configured to determine a destination node according to the BGP routing message, and allocate a source node from the first AS, where the destination node belongs to a second AS, and the second AS is at least one AS that is directly connected to the first AS, the processing unit is further configured to obtain a preferred path between the source node and the destination node by using a network topology, where the network topology includes an intra-domain topology of the first AS and an inter-domain topology between BRs of the first AS and the second AS, the processing unit is further configured to determine a first BR and a second BR on the preferred path according to the preferred path, where the first BR belongs to the first AS, and the second BR belongs to the second AS, and the processing unit is further configured to send a routing control message to the first BR, where the routing control message is used to instruct the first BR to use the second BR as a next hop for packet forwarding.

With reference to the eighth aspect, in a first possible implementation of the eighth aspect, the determining, according to a node that sends the BGP routing message to the controller, whether to perform outgoing-traffic adjustment and control includes the processing unit is further configured to perform outgoing-traffic adjustment and control if determining that the node that sends the BGP routing message to the controller is a BR of the first AS.

With reference to the first possible implementation of the eighth aspect, in a second possible implementation of the eighth aspect, the determining, according to a node that sends the BGP routing message to the controller, whether to perform outgoing-traffic adjustment and control includes the processing unit is further configured to search a first configuration information table by using the node that sends the BGP routing message to the controller, as a first match item, to obtain an operation corresponding to the first match item, where the obtained operation is performing outgoing-traffic adjustment and control.

With reference to the first possible implementation of the eighth aspect, in a third possible implementation of the eighth aspect, the determining, according to a node that sends the BGP routing message to the controller, whether to perform outgoing-traffic adjustment and control includes the processing unit is further configured to obtain a first destination prefix according to the BGP routing message, and the processing unit is further configured to search a second configuration information table by using the node that sends the BGP routing message to the controller and the first destination prefix as a second match item, to obtain an operation corresponding to the second match item, where the obtained operation is performing outgoing-traffic adjustment and control.

With reference to any one of the eighth aspect, or the first to the third possible implementations of the eighth aspect, in a fourth possible implementation of the eighth aspect, the allocating a source node from the first AS includes the processing unit is further configured to search a first configuration information table by using the node that sends the first BGP routing message to the controller, as a first match item, to obtain a source node corresponding to the first match item, as the source node, or, obtaining, by the processing unit, a first destination prefix according to the first BGP routing message, and searching, by the processing unit, a second configuration information table by using the node that sends the first BGP routing message to the controller and the first destination prefix as a second match item, to obtain a source node corresponding to the second match item, as the source node.

With reference to any one of the eighth aspect, or the first to the fourth possible implementations of the eighth aspect, in a fifth possible implementation of the eighth aspect, the destination node is a BR in the second AS, and the inter-domain topology between the BRs of the first AS and the second AS includes, an inter-domain topology between a BR of the first AS and a BR of the second AS.

With reference to any one of the eighth aspect, or the first to the fourth possible implementations of the eighth aspect, in a sixth possible implementation of the eighth aspect, the destination node is a virtual node that is set in the second AS, and the inter-domain topology between the BRs of the first AS and the second AS includes, an inter-domain topology between a BR of the first AS and a BR of the second AS, and a topology between the destination node and the BR of the second AS.

With reference to the fifth or the sixth possible implementation of the eighth aspect, in a seventh possible implementation of the eighth aspect, a manner in which the controller obtains the inter-domain topology is the processing unit is further configured to establish a link between a BR that is identified by a next-hop field included in the BGP routing message and the node that sends the BGP routing message to the controller, to obtain the inter-domain topology, where the BR identified by the next-hop field belongs to the second AS, or the processing unit is further configured to establish a link between a BR that is identified by a community attribute field included in the BGP routing message and the node that sends the BGP routing message to the controller, to obtain the inter-domain topology, where the BR identified by the community attribute field belongs to the second AS.

With reference to any one of the eighth aspect, or the first to the fourth possible implementations of the eighth aspect, in an eighth possible implementation of the eighth aspect, a manner in which the controller obtains the inter-domain topology is: the processing unit is further configured to obtain a direct route of the BR of the first AS by using an Interior Gateway Protocol IGP routing message, the processing unit is further configured to determine whether the obtained direct route and a link identifier are stored in a match item of a link information configuration table, and if determining that the obtained direct route and the link identifier are stored in the match item of the link information configuration table, the processing unit is further configured to establish the inter-domain topology between the first AS and the second AS according to the link identifier, and correspondingly, that the processing unit is further configured to obtain a preferred path between the source node and the destination node by using a network topology includes obtaining, by the processing unit, an affinity attribute constraint condition according to a link between the node that sends the BGP routing message to the controller and the BR of the second AS, and obtaining, by the processing unit, the preferred path by using the network topology and the affinity attribute constraint condition.

With reference to any one of the eighth aspect, or the first to the eighth possible implementations of the eighth aspect, in a ninth possible implementation of the eighth aspect, the routing control message includes a destination prefix, an identifier of the second BR, and an operation manner, the operation manner instructs the first BR to use the second BR as a next hop for routing to the destination prefix, and the destination prefix is obtained from the BGP routing message.

With reference to the ninth possible implementation of the eighth aspect, in a tenth possible implementation of the eighth aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and a sub-TLV field, where the match type field carries a permit value, the sub-type length value sub-TLV quantity field indicates that a quantity of sub-TLVs carried in the match field is 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries an identifier of the first BR, and the neighbor peer device identifier field carries the identifier of the second BR, the action field includes an action type field and an action length field, where the action type field indicates to perform a preferred-routing operation, and the action length field indicates a length of the action field or a length of the action value field, and the BGP policy attribute instructs the first BR to perform matching between the identifier of the first BR and the neighbor local device identifier field in the neighbor pair field, and if the matching succeeds, to perform an operation of using the second BR as the next hop for routing to the destination prefix.

According to a ninth aspect, a border router is provided, where the border router is used as a first border router BR, the first BR belongs to a first autonomous system AS, and the first BR includes a communications unit, configured to receive a routing control message from a controller, where the routing control message is used to instruct the first BR to use a second BR as a next hop for packet forwarding, and the second BR belongs to a second AS, and a processing unit, configured to determine, according to the routing control message, the second BR as the next hop for packet forwarding.

With reference to the ninth aspect, in a first possible implementation of the ninth aspect, the routing control message includes a destination prefix, an identifier of the second BR, and an operation manner, the operation manner instructs the first BR to use the second BR as a next hop for routing to the destination prefix, and the destination prefix is obtained from a BGP routing message, and correspondingly, the processing unit sets the next hop for routing to the destination prefix to the second BR.

With reference to the first possible implementation of the ninth aspect, in a second possible implementation of the ninth aspect, the routing control message is an extended BGP update update message, the extended BGP update message includes a BGP policy attribute, and the BGP policy attribute includes a match field and an action field, where the match field includes a match type field, a sub-type length value sub-TLV quantity field, and a sub-TLV field, where the match type field carries a permit value, the sub-type length value sub-TLV quantity field indicates that a quantity of sub-TLVs carried in the match field is 1, the sub-TLV field includes a sub-type sub-type field, a sub-length sub-length field, and a sub-value sub-value field, the sub-type sub-type field indicates that a type of the sub-value field is a neighbor pair and an IP address type of the neighbor pair, the sub-length field indicates a length of the sub-TLV or a length of the sub-value field, the sub-value field includes a neighbor pair constituted by a neighbor local device identifier field and a neighbor peer device identifier field, the neighbor local device identifier field carries an identifier of the first BR, and the neighbor peer device identifier field carries the identifier of the second BR, the action field includes an action type field and an action length field, where the action type field indicates to perform a preferred-routing operation, and the action length field indicates a length of the action field or a length of the action value field, and the BGP policy attribute instructs the first BR to perform matching between the identifier of the first BR and the neighbor local device identifier field in the neighbor pair field, and if the matching succeeds, to perform an operation of using the second BR as the next hop for routing to the destination prefix.

According to a tenth aspect, a network system is provided, where the network system includes a controller and a border router BR, the controller is any controller according to the eighth aspect, and the BR is any BR according to the ninth aspect.

According to the routing control method, the apparatus, and the system provided in the embodiments of the application, the controller receives the BGP routing message, where the controller is configured to manage the first autonomous system AS, the controller determines, according to the node that sends the first BGP routing message to the controller, whether to perform incoming-traffic or outgoing-traffic adjustment and control, if determining to perform incoming-traffic adjustment and control, the controller determines the destination node according to the first BGP routing message, and allocates the source node from the second AS, where the destination node belongs to the first AS, and the second AS is at least one AS that is directly connected to the first AS, or if determining to perform outgoing-traffic adjustment and control, the controller determines the destination node according to the BGP routing message, and allocates the source node from the first AS, where the destination node belongs to the second AS, and the second AS is at least one AS that is directly connected to the first AS, the controller obtains the preferred path between the source node and the destination node by using the network topology, where the network topology includes the intra-domain topology of the first AS and the inter-domain topology between the BRs of the first AS and the second AS, the controller determines the first BR and the second BR on the preferred path according to the preferred path, where the first BR belongs to the first AS, and the second BR belongs to the second AS, and the controller sends the routing control message to the BR, to control the BR to forward, according to the preferred path, data traffic flowing into and out of the first AS. This helps an operator to automatically adjust and control data traffic flowing into and out of an AS managed by the operator.

BRIEF DESCRIPTION OF THE DRAWINGS

To describe the technical solutions in the application more clearly, the following briefly describes the accompanying drawings used in the embodiments. Apparently, the accompanying drawings in the following descriptions show merely some embodiments of the application, and persons of ordinary skill in the art may still derive other technical solutions and drawings that can also implement the application, from these accompanying drawings without creative efforts. These technical solutions and drawings shall also be considered as falling within the scope of the application.

FIG. 4a shows a coding format of a BGP policy attribute according to an embodiment of the application;

FIG. 4b shows another coding format of a BGP policy attribute according to an embodiment of the application;

FIG. 12 is a schematic diagram of a BGP policy attribute according to an embodiment of the application;

FIG. 13 is a simplified schematic diagram of a routing control method on a border router side according to an embodiment of the application;

FIG. 14 is a schematic structural diagram of a controller according to an embodiment of the application;

DETAILED DESCRIPTION OF ILLUSTRATIVE EMBODIMENTS

To make persons skilled in the art better understand the solutions in the application, the following further describes the embodiments of the application in detail with reference to the accompanying drawings and implementations.

Before the technical solutions in the embodiments of the application are described, a specific application scenario of the embodiments of the application is briefly described first.

Figure 1:
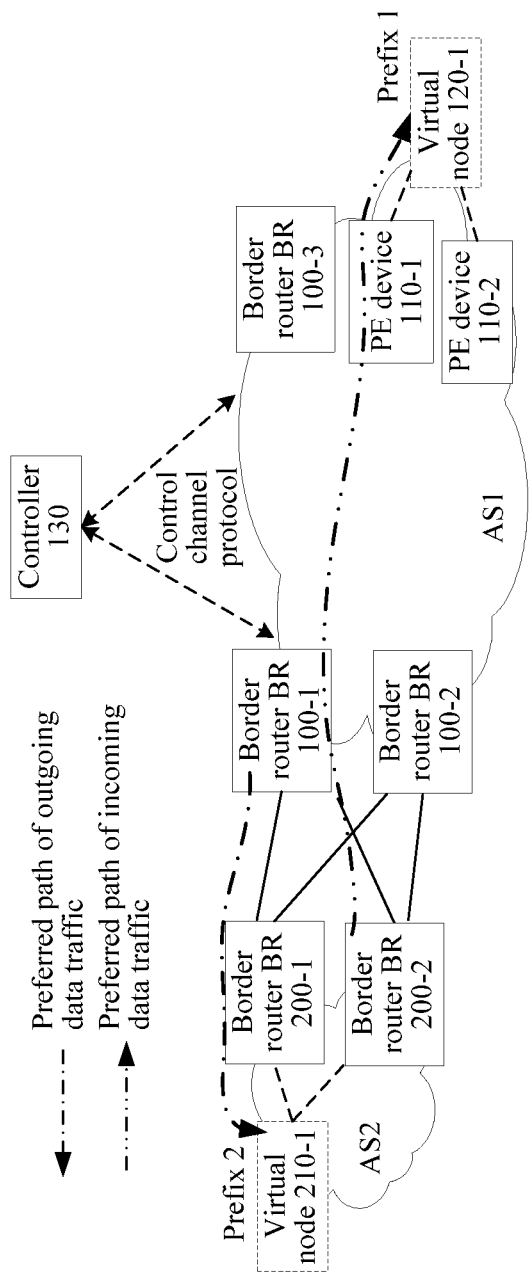
FIG. 1 is a schematic network diagram according to an embodiment of the application.

Referring to FIG. 1, FIG. 1 shows a scenario of a network architecture that is based on control-forwarding separation. A controller manages a network device in a first autonomous system AS1. The network device includes a border router and a PE device. Specifically, the controller controls border routers BR100-1, BR100-2, and BR100-3, a PE device 110-1, and a PE device 110-2 in the AS1 by using a control channel protocol. A BR200-1 and a BR200-2 are border routers located in a second autonomous system AS2. A BR between the AS1 and the AS2 performs routing control by using a routing message defined by the BGP protocol. Specifically, the routing message may be a BGP update update message. For example, the routing message may include at least the following fields: a network prefix, a multi-exit discriminator (MED), a next hop (NH), an autonomous system path (AS PATH), and a local preference. The prefix field is used to carry a destination reachable address that may be an IP address or a network segment address. The MED field is used to carry a MED value. Based on an existing route selection policy, an IGW with a smallest MED value may be selected as an optimal route. The NH field is used to carry an identifier of a next hop in packet forwarding. For example, the identifier of the next hop may be an IP address, a device identity, a device port identifier, or the like. The AS path field is used to carry a number of an AS that is passed through during packet forwarding. Based on the existing route selection policy, a BR with a shortest AS path may be selected as an optimal route. That an AS path is the shortest may be understood as that a quantity of AS numbers included in the AS path is the smallest. The local preference field is used to carry a local preference value. Based on the existing route selection policy, a BR with a largest local preference value may be selected as an optimal route.

Outgoing data traffic and incoming data traffic shown in FIG. 1 are specific to the AS1. The outgoing data traffic (simply referred to as outgoing traffic) means traffic flowing out of the AS1, and the incoming data traffic (simply referred to as incoming traffic) means traffic flowing into the AS1. Both the outgoing traffic and the incoming traffic are service data traffic.

It should be noted that, first, the AS2 in this embodiment represents an AS that is directly connected to the AS1. Specifically, the AS2 may include one or more or all of ASs that are directly connected to the AS1. No specific limitation is imposed herein.

Secondly, the AS1 in this embodiment may further include a provider P device.

Thirdly, the PE and BR in this embodiment may be collectively referred to as a border network device in one AS, and may be routers, switches, or other network forwarding devices.

Lastly, the controller may be an independent device. Alternatively, the controller may be a route reflector (RR), a PE, a BR, or a P device into which a controller function is integrated. Alternatively, a function of the controller may be implemented by multiple different devices together, that is, the function of the controller is divided and distributed to the multiple different devices, so as to implement the function of the controller in a distributed manner. This embodiment of the application does not impose any specific limitation on a form of the controller in a network.

The embodiments of the application provide a routing control method, so as to automatically and flexibly adjust and control a forwarding path through which data traffic flows into and out of an AS. The following provides descriptions from two aspects: incoming traffic and outgoing traffic.

1. Incoming-Traffic Routing Control Method, Apparatus, and System

The incoming-traffic routing control method in the embodiments of the application includes processing on a controller side and a border router side. The following provides descriptions separately.

Figure 2:
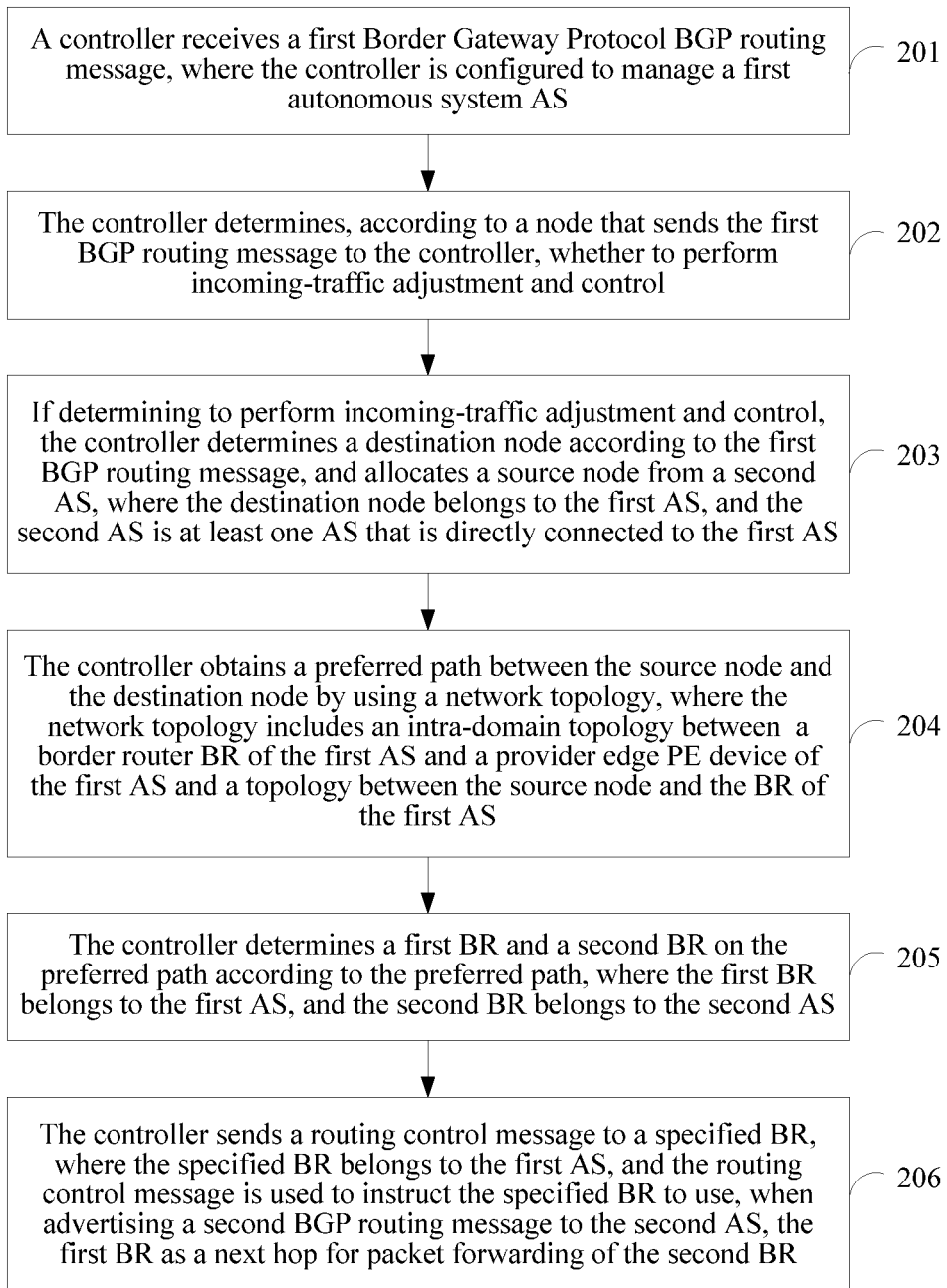
FIG. 2 is a simplified schematic diagram of a routing control method on a controller side according to an embodiment of the application.

FIG. 2 is a simplified flowchart of a routing control method on a controller side according to an embodiment of the application. If the method is applied to a network scenario similar to that shown in FIG. 1, the method includes the operations described below. It should be noted that the method shown in FIG. 2 not only can be applied to a network structure shown in FIG. 1, but also can be applied to another type of network system, for example, a network system constituted by a network device that does not use any replaceable component.

201: A controller receives a first Border Gateway Protocol BGP routing message, where the controller is configured to manage a first autonomous system AS.

202: The controller determines, according to a node that sends the first BGP routing message to the controller, whether to perform incoming-traffic adjustment and control.

Optionally, there may be the following several manners in which the controller determines to perform incoming-traffic adjustment and control.

Manner 1: The controller performs incoming-traffic adjustment and control if the controller determines that the node that sends the first BGP routing message to the controller is a border network device of the first AS. The border network device of the first AS is a BR device or a provider edge (PE) device.

With reference to an example shown in FIG. 1, the node that sends the first BGP routing message to the controller may be the PE device 110-1, the PE device 110-2, the border router BR100-3, the border router BR100-1, or the border router BR100-2. All these devices are border network devices of the AS1. When receiving the first BGP routing message sent from these border network devices of the AS1, the controller 130 determines to perform incoming-traffic adjustment and control. This is a random adjustment and control manner.

Manner 2: The controller searches a first configuration information table by using the node that sends the first BGP routing message to the controller, as a first match item, to obtain an operation corresponding to the first match item, where the obtained operation is performing incoming-traffic adjustment and control.

With reference to the example in FIG. 1, for example, if the node that sends the first BGP routing message to the controller is the PE device 110-1, the controller 130 searches, by using an identifier of the PE device 110-1 as a match item, a configuration information table shown in Table 1, to obtain an operation manner that is incoming-traffic adjustment and control. This is a type of coarse-grained traffic adjustment and control for a node.

TABLE 1

Configuration information table

| Match item | Operation manner |
|---|---|
| Identifier of the PE device 110-1 | Incoming-traffic adjustment and control |
| Identifier of the PE device 110-2 | Incoming-traffic adjustment and control |
| Identifier of the border router BR100-3 | Incoming-traffic adjustment and control |

Manner 3: The controller obtains a first destination prefix according to the first BGP routing message.

The controller searches a second configuration information table by using the node that sends the first BGP routing message to the controller and the first destination prefix as a second match item, to obtain an operation corresponding to the second match item, where the obtained operation is performing incoming-traffic adjustment and control.

With reference to the example in FIG. 1, for example, if the node that sends the first BGP routing message to the controller 130 is the PE device 110-1, and a destination prefix obtained by the controller 130 from the first BGP routing message is a prefix 1 (for example, an IP address prefix 10.1.0.0/16 or an IP address 10.1.1.1/32; the prefix 1 is a routing destination prefix in a network, and is further used to identify a virtual node 120-1 in this embodiment of the application), the controller 130 searches, by using an identifier (which may be, for example, an IP address) of the PE device 110-1 and the prefix 1 as a match item, a configuration information table shown in Table 2, to obtain an operation manner that is incoming-traffic adjustment and control. This is a type of fine-grained traffic adjustment and control for a node and a prefix.

TABLE 2

Configuration information table

| Match item | | |
| --- | --- | --- |
| Device identifier | Destination prefix | Operation manner |
| Identifier of the PE device 110-1 | Prefix 1 | Incoming-traffic adjustment and control |
| Identifier of the PE device 110-2 | Prefix 2 | Incoming-traffic adjustment and control |
| Identifier of the border router BR100-3 | Prefix 3 | Incoming-traffic adjustment and control |

203: If determining to perform incoming-traffic adjustment and control, the controller determines a destination node according to the first BGP routing message, and allocates a source node from a second AS, where the destination node belongs to the first AS, and the second AS is at least one AS that is directly connected to the first AS.

Optionally, there may be the following several manners in which the controller determines the destination node.

Manner 1: The controller determines whether at least two first BGP routing messages are received.

If determining that at least two first BGP routing messages are received, the controller sets a virtual node in the first AS, and determines the virtual node as the destination node.

Correspondingly, an intra-domain topology further includes a link between the node that sends the first BGP routing message to the controller and the destination node.

With reference to the example in FIG. 1, if the controller 130 determines that two first BGP routing messages are received from the PE device 110-1 and the PE device 110-2 respectively, the controller sets the virtual node 120-1 (for example, the prefix 1 may be used to identify the node) in the AS1, adds a virtual link between the virtual node 120-1 and the PE device 110-1, and adds a virtual link between the virtual node 120-1 and the PE device 110-2.

Manner 2: The controller sets a virtual node in the first AS, and determines the virtual node as the destination node.

Correspondingly, an intra-domain topology further includes a virtual link between a border network device of the first AS and the destination node; and obtaining, by the controller, a preferred path between the source node and the destination node by using a network topology includes: obtaining, by the controller, a first affinity attribute constraint condition according to a link between the node that sends the first BGP routing message to the controller and the destination node; and obtaining, by the controller, the preferred path by using the network topology and the first affinity attribute constraint condition.

Figure 3A:
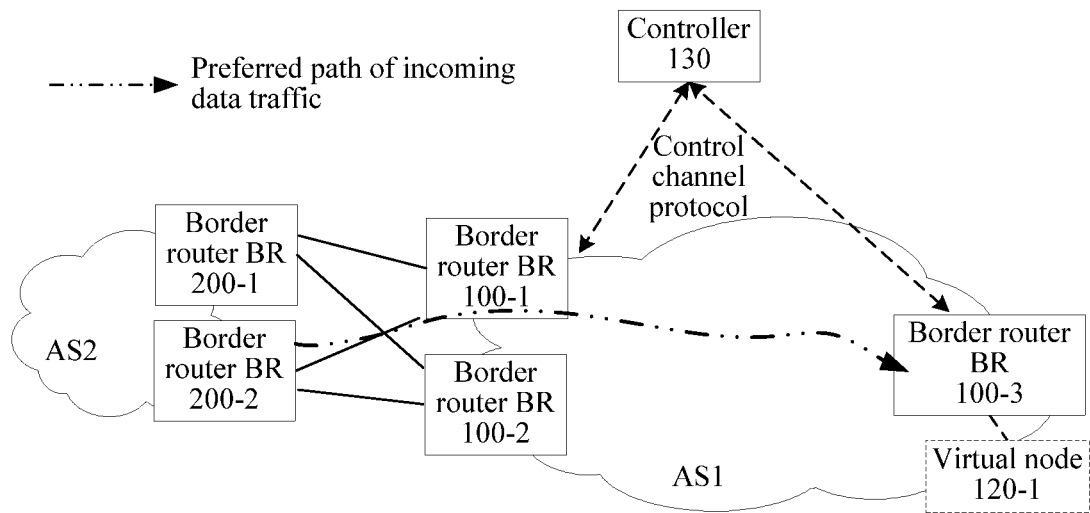
FIG. 3a is a schematic network diagram of incoming-traffic control according to an embodiment of the application.

With reference to an example in FIG. 3a, the controller 130 sets the virtual node 120-1 as the destination node, and the intra-domain topology further includes a virtual link between the BR100-3 of the AS1 and the virtual node 120-1. For example, the node that sends the first BGP routing message to the controller is the BR100-3. The controller 130 adds, for the incoming traffic, a first affinity attribute to the virtual link between the BR100-3 and the virtual node 120-1. The controller 130 obtains the preferred path between the source node (the BR200-2) and the destination node (the virtual node 120-1) by using the network topology and the first affinity attribute constraint condition.

Manner 3: The controller may alternatively determine the node that sends the first BGP routing message to the controller, as the destination node.

With reference to the example in FIG. 1, the controller 130 is likely to determine, according to different service traffic, the destination node from the following nodes: the PE device 110-1, the PE device 110-2, the border router BR100-3, the border router BR100-1, and the border router BR100-2.

Optionally, there may be the following several manners in which the controller allocates the source node.

Manner 1: The controller selects one node from a border router or a virtual node in the second AS, as the source node. It should be noted that the controller may alternatively select one node from a P device or a PE device in the second AS, as the source node.

With reference to the example in FIG. 1, the controller 130 selects one BR from the border routers BRs in the AS2, as the source node. For example, the BR200-2 is selected as the source node.

Manner 2: The controller searches a third configuration information table by using the node that sends the first BGP routing message to the controller, as a first match item, to obtain a source node corresponding to the first match item, as the source node.

With reference to the example in FIG. 1, for example, if the node that sends the first BGP routing message to the controller is the PE device 110-1, the controller 130 searches, by using the identifier of the PE device 110-1 as a match item, a configuration information table shown in Table 3, to obtain a source node that is the BR200-2.

TABLE 3

Configuration information table

| Match item | Source node |
| --- | --- |
| Identifier of the PE device 110-1 | Identifier of the border router BR200-2 |
| Identifier of the PE device 110-2 | Identifier of the border router BR200-1 |
| Identifier of the border router BR100-3 | Identifier of the border router BR200-2 |

Manner 3: The controller obtains a first destination prefix according to the first BGP routing message.

The controller searches a fourth configuration information table by using the node that sends the first BGP routing message to the controller and the first destination prefix as a second match item, to obtain a source node corresponding to the second match item, as the source node.

With reference to the example in FIG. 1, for example, if the node that sends the first BGP routing message to the controller 130 is the PE device 110-1, and a destination prefix obtained by the controller 130 from the first BGP routing message is the prefix 1 (for example, the IP address prefix 10.1.0.0/16 or the IP address 10.1.1.1/32; the prefix 1 is a routing destination prefix in a network, and is further used to identify the virtual node 120-1 in this embodiment of the application), the controller 130 searches, by using the identifier (which may be, for example, the IP address) of the PE device 110-1 and the prefix 1 as a match item, a configuration information table shown in Table 4, to obtain a source node that is the BR200-2.

TABLE 4

Configuration information table

| Match item | | |
|---|---|---|
| Device identifier | Destination prefix | Source node |
| Identifier of the PE device 110-1 | Prefix 1 | Identifier of the border router BR200-2 |
| Identifier of the PE device 110-2 | Prefix 2 | Identifier of the border router BR200-1 |
| Identifier of the border router BR100-3 | Prefix 3 | Identifier of the border router BR200-2 |

204: The controller obtains the preferred path between the source node and the destination node by using the network topology, where the network topology includes the intra-domain topology of the first AS and an inter-domain topology between BRs of the first AS and the second AS.

The intra-domain topology of the first AS may include the following several cases:

Case 1: The intra-domain topology of the first AS includes at least one BR of the first AS and/or a link that connects BRs of the first AS.

Case 2: The intra-domain topology of the first AS includes at least one BR of the first AS, at least one provider edge PE device, and a link that connects these devices.

Case 3: The intra-domain topology of the first AS includes at least one BR of the first AS, at least one provider edge PE device, at least one P device, and a link that connects these devices.

Case 4: The intra-domain topology of the first AS includes at least one BR of the first AS, at least one provider P device, and a link that connects these devices.

The inter-domain topology between the BRs of the first AS and the second AS may include two cases:

Case 1: When the source node is a BR that is in the second AS and that is directly connected to the first AS, the inter-domain topology between the BRs of the first AS and the second AS includes an inter-domain topology between a BR of the first AS and a BR of the second AS.

With reference to the example in FIG. 1, the inter-domain topology includes the BR200-1, the BR200-2, the BR100-1, the BR100-2, and a link that connects these nodes.

Case 2: When the source node is a virtual node that is set in the second AS, the inter-domain topology between the BRs of the first AS and the second AS includes: an inter-domain topology between a BR of the first AS and a BR of the second AS, and a topology between the source node and the BR of the second AS.

With reference to the example in FIG. 1, the inter-domain topology includes the BR200-1, the BR200-2, the BR100-1, the BR100-2, and a link that connects these nodes. The inter-domain topology further includes a virtual node 210-1, a virtual link between the virtual node 210-1 and the BR200-1, and a virtual link between the virtual node 210-1 and the BR200-2.

Optionally, a manner in which the controller obtains the inter-domain topology is obtaining, by the controller, a direct route of the BR of the first AS by using an Interior Gateway Protocol IGP routing message, determining, by the controller, whether the obtained direct route and a link identifier are stored in a match item of a link information configuration table, and if determining that the obtained direct route and the link identifier are stored in the match item of the link information configuration table, establishing, by the controller according to the link identifier, the inter-domain topology between the first AS and an AS that is directly connected to the first AS.

With reference to the example in FIG. 1, the preferred path is a preferred path of incoming data traffic from the BR200-2, through the BR100-1 and the PE device 110-1, to the virtual node 120-1.

It should be noted that there may also be a P device in an AS1 domain. In a possible scenario, the P device in the AS1 domain may also be included on the preferred path.

Figure 3B:
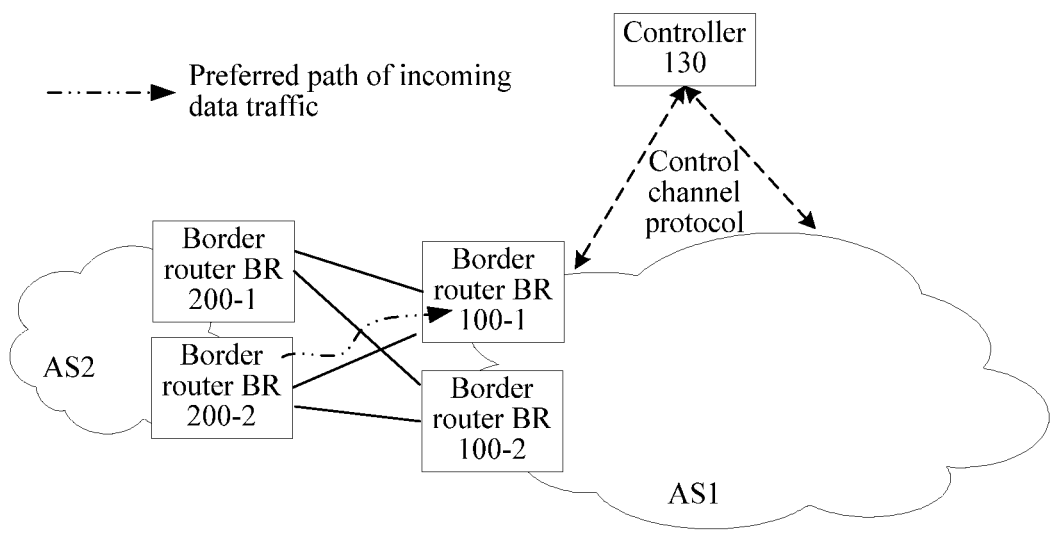
FIG. 3b is another schematic network diagram of incoming-traffic control according to an embodiment of the application.

With reference to an example in FIG. 3b, the preferred path is a preferred path of incoming data traffic in an inter-domain topology from the BR200-2 to the BR100-1. In this case, the BR100-1 may be used as a border router of the AS1, or may be a network device that has both a border router function and a PE function.

205: The controller determines a first BR and a second BR on the preferred path according to the preferred path, where the first BR belongs to the first AS, and the second BR belongs to the second AS.

With reference to the example in FIG. 1, the first BR is the BR100-1, and the second BR is the BR200-1.

206: The controller sends a routing control message to a specified BR, where the specified BR belongs to the first AS, and the routing control message is used to instruct the specified BR to use, when advertising a second BGP routing message to the second AS, the first BR as a next hop for packet forwarding of the second BR.

Optionally, the controller sends the routing control message to at least one border router of the first AS. Optionally, this includes sending the routing control message to all border routers of the first AS.

Optionally, the routing control message may have multiple specific forms, and may be an extended BGP update message. Specifically, the routing control message may alternatively be a BGP flow specification (FLOWSPEC) message, or may be an extended OpenFlow OpenFlow protocol of software-defined networking (SDN). The routing control message has two control manners:

Manner 1: The routing control message includes a neighbor pair constituted by an identifier of the first BR and an identifier of the second BR, and an operation manner. The operation manner instructs the specified BR to perform matching, when advertising the second BGP routing message to a destination BR in the second AS, between an identifier of the specified BR and an identifier of the destination BR and the neighbor pair, and if the matching succeeds, not to perform an operation of increasing an AS quantity in an AS-path attribute value carried in the second BGP routing message, or if the matching fails, to perform an operation of increasing an AS quantity in an AS-path attribute value. The destination BR is a BR in the second AS.

Taking the extended BGP update message for example, the function may be implemented by extending a new BGP policy attribute. For definitions about the BGP update message and a related attribute, refer to the Request for Comments (RFC) 4271 standard defined by the Internet Engineering Task Force (IETF). For a definition about the BGP FLOWSPEC message, refer to the RFC5575. Details are not described herein. As shown in FIG. 4*a*, a newly extended BGP policy attribute in this embodiment includes a match field and an action field.

The match field includes a match type field, a sub-type length value sub-TLV quantity field, and a sub-TLV field. A possible value of the match type field is 0 (indicating permission) or 1 (indicating rejection). With reference to the example of incoming-traffic adjustment and control in FIG. 1, a value of the match type field is 1, indicating rejection.

The sub-type length value sub-TLV quantity field indicates a quantity of sub-TLVs carried in the match field, and a value of the sub-type length value sub-TLV quantity field may be a positive integer greater than or equal to 0. With reference to the example of incoming-traffic adjustment and control in FIG. 1, the value of the sub-TLV quantity field is 1.

The sub-TLV field includes a sub-type sub-type field, a sub-length sub-length field, and a sub-value sub-value field. The sub-type sub-type field is used to identify a type of a neighbor pair, and may be an Internet Protocol version 4 (IPv4) address or an IPv6 address. A possible value of the sub-type field is as follows:

sub-type=1, instructing to match an IPv4 neighbor pair, that is, a neighbor pair in which each device identifier is identified by using an IPv4 address; or sub-type=2, instructing to match an IPv6 neighbor pair, that is, a neighbor pair in which each device identifier is identified by using an IPv6 address.

The sub-length field indicates a length of the sub-TLV or a length of the sub-value field. The sub-value field includes a neighbor pair constituted by a neighbor local device identifier field and a neighbor peer device identifier field. For example, a length of the neighbor local device identifier field may be 4 bytes or 16 bytes, and a length of the neighbor peer device identifier field may be 4 bytes or 16 bytes. With reference to the example of incoming-traffic adjustment and control in FIG. 1, the neighbor local device identifier field carries the identifier of the first BR, and the neighbor peer device identifier field carries the identifier of the second BR.

The action field includes an action type field, an action length field, and an action value field. A possible value of the action type (Action Type) field includes but is not limited to the following: action type=1, instructing to perform a preferred-routing operation, where a length of the action type field may be 2 bytes; or action type=2, instructing to perform an operation of increasing an AS-path (AS-path) length, where a length of the action type field may be 2 bytes.

With reference to the example of incoming-traffic adjustment and control in FIG. 1, action type=2, instructing to perform the operation of increasing the AS quantity in the AS-path.

The action length field indicates a length of the action field or a length of the action value field. The action value field carries the AS quantity.

Manner 2: The routing control message includes at least one neighbor pair and an operation manner. The at least one neighbor pair does not include a neighbor pair constituted by an identifier of the first BR and an identifier of the second BR. The operation manner instructs the specified BR to perform matching, when advertising the second BGP routing message to a destination BR in the second AS, between an identifier of the specified BR and an identifier of the destination BR and each of the at least one neighbor pair, and if the matching succeeds, to perform an operation of increasing an AS quantity in an AS-path attribute value, or if the matching fails, not to perform an operation of increasing an AS quantity in an AS-path attribute value. The destination BR is a BR in the second AS.

Taking the extended BGP update message for example, the function may be implemented by extending a new BGP policy attribute. A format of a newly added BGP policy attribute herein may be the same as a format shown in FIG. 4*a*, except that field values are different in different usage scenarios. The format description is not described again.

As shown in FIG. 4*b*, with reference to the example of incoming-traffic adjustment and control in FIG. 1, a value of the match type field is 0, indicating permission. A value of the sub-type length value sub-TLV quantity field is a positive integer greater than or equal to 1. This indicates that one or more sub-TLVs are included, and also means that one or more neighbor pairs are included.

A sub-value field in each sub-TLV includes a neighbor pair constituted by a neighbor local device identifier field and a neighbor peer device identifier field. The neighbor local device identifier field carries an identifier of a BR in the first AS, other than the identifier of the first BR. The neighbor peer device identifier field carries an identifier of a BR in the second AS, other than the identifier of the second BR.

Incoming-traffic adjustment and control in FIG. 1 is used as an example. A neighbor pair included in a sub-TLV 1 is (BR100-1, BR200-1), a neighbor pair included in a sub-TLV 2 is (BR100-1, BR200-2), a neighbor pair included in a sub-TLV 3 is (BR100-2, BR200-1), and a neighbor pair included in a sub-TLV 4 is (BR100-2, BR200-2).

It should be noted that multiple formats may be used for a control packet in the embodiment shown in FIG. 2. FIG. 4*a* and FIG. 4*b* are two specific examples of the formats, and a value and a length of each field in the formats are also merely examples.

It should be noted that Table 1 to Table 4 in the embodiment shown in FIG. 2 are merely examples. A specific implementation may alternatively be: Table 1 and Table 3 are combined into one table for implementation, and Table 2 and Table 4 are combined into one table for implementation. An application described herein is not limited to a disclosed specific form. Instead, this disclosure covers all modifications, equivalents, and replacements falling within the scope of the accompanying claims.

It can be learned from the foregoing embodiment that, according to the solution in this embodiment, the controller receives the first BGP routing message, then automatically determines to perform incoming-traffic control, calculates the preferred path from the source node to the destination node, obtains the first BR and the second BR on the preferred path, sends the routing control message to the BR in the AS1 controlled by the controller, and instructs the BR to use, when advertising the second BGP routing message to the second AS, the first BR as the next hop for packet forwarding of the second BR. Therefore, compared with a prior-art method in which configuration is manually performed one by one, this method facilitates automatic and flexible adjustment and control of data traffic flowing into an AS, simplifies configuration, and saves human power.

Figure 5:
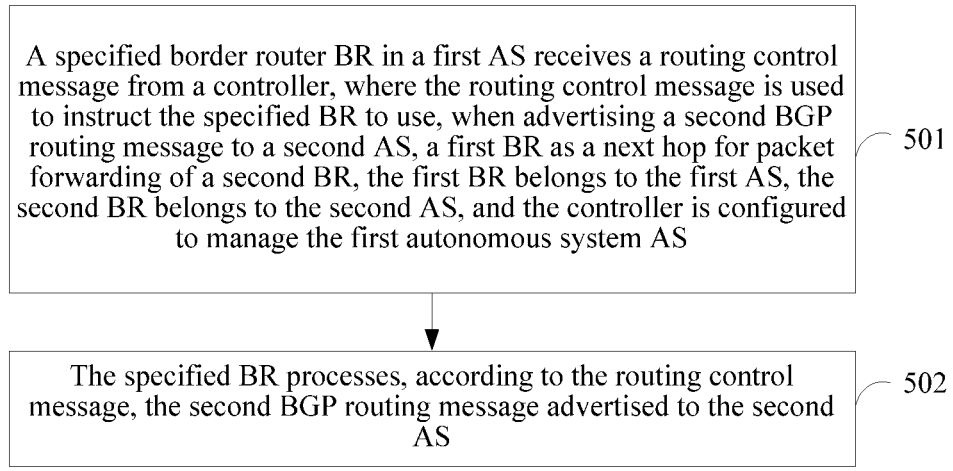
FIG. 5 is a simplified schematic diagram of a routing control method on a border router side according to an embodiment of the application.

FIG. 5 is a simplified flowchart of a routing control method on a border router side according to an embodiment of the application. If the method is applied to a network scenario similar to that shown in FIG. 1, the method includes the operations described below. It should be noted that the method shown in FIG. 5 not only can be applied to a network structure shown in FIG. 1, but also can be applied to another type of network system, for example, a network system constituted by a network device that does not use any replaceable component.

501: A specified border router BR in a first AS receives a routing control message from a controller, where the routing control message is used to instruct the specified BR to use, when advertising a second BGP routing message to a second AS, a first BR as a next hop for packet forwarding of a second BR, the first BR belongs to the first AS, the second BR belongs to the second AS, and the controller is configured to manage the first autonomous system AS.

502: The specified BR processes, according to the routing control message, the second BGP routing message advertised to the second AS.

It should be noted that the embodiment shown in FIG. 5 is corresponding to the routing control method on the controller side. Descriptions of related content such as the routing control message are the same as those in the embodiment shown in FIG. 2, and details are not described herein again.

Optionally, the routing control message has two possible control manners:

Manner 1: The routing control message includes a neighbor pair constituted by an identifier of the first BR and an identifier of the second BR, and an operation manner. The operation manner instructs the specified BR to perform matching, when advertising the second BGP routing message to a destination BR in the second AS, between an identifier of the specified BR and an identifier of the destination BR and the neighbor pair, and if the matching succeeds, not to perform an operation of increasing an AS quantity in an AS-path attribute value carried in the second BGP routing message, or if the matching fails, to perform an operation of increasing an AS quantity in an AS-path attribute value. The destination BR is a BR in the second AS.

Correspondingly, the processing, by the specified BR according to the routing control message, the BGP routing message advertised to the second AS includes performing matching, by the specified BR, between the identifier of the specified BR and the identifier of the destination BR and the neighbor pair when the specified BR advertises the BGP routing message to the destination BR in the second AS, and if the matching succeeds, not performing the operation of increasing the AS quantity in the AS-path attribute value, or if the matching fails, performing the operation of increasing the AS quantity in the AS-path attribute value.

Optionally, the routing control message is an extended BGP update update message, and the extended BGP update message includes a BGP policy attribute. The BGP policy attribute is the same as that in FIG. 4a and the embodiment shown in FIG. 2, and details are not described herein again.

Manner 2: The routing control message includes at least one neighbor pair and an operation manner. The at least one neighbor pair does not include a neighbor pair constituted by an identifier of the first BR and an identifier of the second BR. The operation manner instructs the specified BR to perform matching, when advertising the second BGP routing message to a destination BR in the second AS, between an identifier of the specified BR and an identifier of the destination BR and each of the at least one neighbor pair, and if the matching succeeds, to perform an operation of increasing an AS quantity in an AS-path attribute value, or if the matching fails, not to perform an operation of increasing an AS quantity in an AS-path attribute value. The destination BR is a BR in the second AS.

Correspondingly, the processing, by the specified BR according to the routing control message, the BGP routing message advertised to the second AS includes performing matching, by the specified BR, between the identifier of the specified BR and the identifier of the destination BR and each of the at least one neighbor pair when the specified BR advertises the BGP routing message to the destination BR in the second AS, and if the matching succeeds, performing the operation of increasing the AS quantity in the AS-path attribute value, or if the matching fails, not performing the operation of increasing the AS quantity in the AS-path attribute value.

Optionally, the routing control message is an extended BGP update update message, and the extended BGP update message includes a BGP policy attribute. The BGP policy attribute is the same as that in FIG. 4b and the embodiment shown in FIG. 2, and details are not described herein again.

It should be noted that the "processing" in the processing the BGP routing message advertised to the second AS in this embodiment may include performing a matching-related operation and performing an operation of sending the BGP routing message to the destination BR.

It should be noted that the when the specified BR advertises the BGP routing message to the destination BR in the second AS may be understood as before the specified BR advertises the BGP routing message to the destination BR in the second AS.

It can be learned from the foregoing embodiment that, according to the solution in this embodiment, the specified border router BR in the first AS receives the routing control message from the controller, and processes, according to the routing control message, the second BGP routing message advertised to the second AS. Therefore, compared with a prior-art method in which configuration is manually performed one by one, this method facilitates automatic and flexible adjustment and control of data traffic flowing into the first AS, simplifies configuration, and saves human power.

Figure 6:
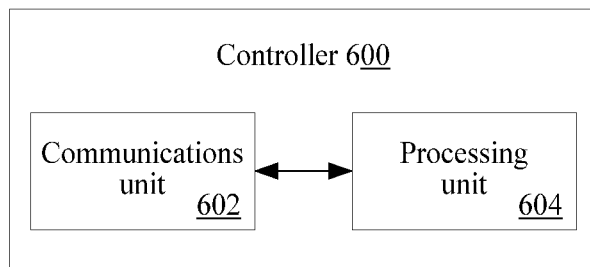
FIG. 6 is a schematic structural diagram of a controller according to an embodiment of the application.

Corresponding to the method shown in FIG. 2, FIG. 6 is a schematic structural diagram of a controller 600 according to an embodiment of the application. The controller 600 includes a communications unit 602, configured to receive a first Border Gateway Protocol BGP routing message, and a processing unit 604, configured to determine, according to a node that sends the first BGP routing message to the controller, whether to perform incoming-traffic adjustment and control.

If determining to perform incoming-traffic adjustment and control, the processing unit 604 is further configured to determine a destination node according to the first BGP routing message, and allocate a source node from a second AS, where the destination node belongs to a first AS, and the second AS is at least one AS that is directly connected to the first AS.

The processing unit 604 further obtains a preferred path between the source node and the destination node by using a network topology, where the network topology includes an intra-domain topology of the first AS and an inter-domain topology between BRs of the first AS and the second AS.

The processing unit 604 is further configured to determine a first BR and a second BR on the preferred path according to the preferred path, where the first BR belongs to the first AS, and the second BR belongs to the second AS.

The communications unit 602 is further configured to send a routing control message to a specified BR, where the specified BR belongs to the first AS, and the routing control message is used to instruct the specified BR to use, when advertising a second BGP routing message to the second AS, the first BR as a next hop for packet forwarding of the second BR.

Optionally, a possible manner in which the processing unit 604 determines whether to perform incoming-traffic adjustment and control is as follows.

Manner 1: The processing unit 604 performs incoming-traffic adjustment and control if the processing unit 604 determines that the node that sends the first BGP routing message to the controller is a border network device of the first AS, where the border network device of the first AS is a BR device or a provider edge PE device.

Manner 2: The processing unit 604 searches a first configuration information table by using the node that sends the first BGP routing message to the controller, as a first match item, to obtain an operation corresponding to the first match item, where the obtained operation is performing incoming-traffic adjustment and control.

Manner 3: The processing unit 604 obtains a first destination prefix according to the first BGP routing message.

The processing unit 604 searches a second configuration information table by using the node that sends the first BGP routing message to the controller and the first destination prefix as a second match item, to obtain an operation corresponding to the second match item, where the obtained operation is performing incoming-traffic adjustment and control.

Further, optionally, a possible manner in which the processing unit 604 determines the destination node according to the first BGP routing message is as follows.

Manner 1: The processing unit 604 determines whether at least two first BGP routing messages are received.

If determining that at least two first BGP routing messages are received, the processing unit 604 sets a virtual node in the first AS, and determines the virtual node as the destination node.

Correspondingly, the intra-domain topology further includes a link between the node that sends the first BGP routing message to the controller and the destination node.

Manner 2: The processing unit 604 sets a virtual node in the first AS, and determines the virtual node as the destination node.

Correspondingly, the intra-domain topology further includes a link between the border network device of the first AS and the destination node.

The obtaining, by the processing unit 604, a preferred path between the source node and the destination node by using a network topology includes obtaining, by the processing unit 604, a first affinity attribute constraint condition according to a link between the node that sends the first BGP routing message to the controller and the destination node; and obtaining, by the controller, the preferred path by using the network topology and the first affinity attribute constraint condition.

Manner 3: The processing unit 604 may alternatively determine the node that sends the first BGP routing message to the controller, as the destination node.

Further, optionally, a possible manner of allocating the source node from the second AS is as follows.

Manner 1: The processing unit 604 selects one node from a border router or a virtual node in the second AS, as the source node.

Manner 2: The processing unit 604 searches a third configuration information table by using the node that sends the first BGP routing message to the controller, as a first match item, to obtain a source node corresponding to the first match item, as the source node.

Manner 3: The processing unit 604 obtains a first destination prefix according to the first BGP routing message.

The processing unit 604 searches a fourth configuration information table by using the node that sends the first BGP routing message to the controller and the first destination prefix as a second match item, to obtain a source node corresponding to the second match item, as the source node.

Further, optionally, the inter-domain topology between the BRs of the first AS and the second AS has two possible cases.

Case 1: When the source node is a BR that is in the second AS and that is directly connected to the first AS, the inter-domain topology between the BRs of the first AS and the second AS includes an inter-domain topology between a BR of the first AS and a BR of the second AS.

Case 2: When the source node is a virtual node that is set in the second AS, the topology between the BRs of the first AS and the second AS includes: an inter-domain topology between a BR of the first AS and a BR of the second AS, and a topology between the source node and the BR of the second AS.

Further, optionally, a manner in which the processing unit 604 obtains the inter-domain topology is obtaining, by the processor, a direct route of the BR of the first AS by using an Interior Gateway Protocol IGP routing message, determining, by the processor, whether the obtained direct route and a link identifier are stored in a match item of a link information configuration table; and if determining that the obtained direct route and the link identifier are stored in the match item of the link information configuration table, establishing, by the processor according to the link identifier, the inter-domain topology between the first AS and an AS that is directly connected to the first AS.

It should be noted that descriptions of related content such as the routing control message in this embodiment are the same as those in the method embodiment shown in FIG. 2, and details are not described herein again.

Figure 7:
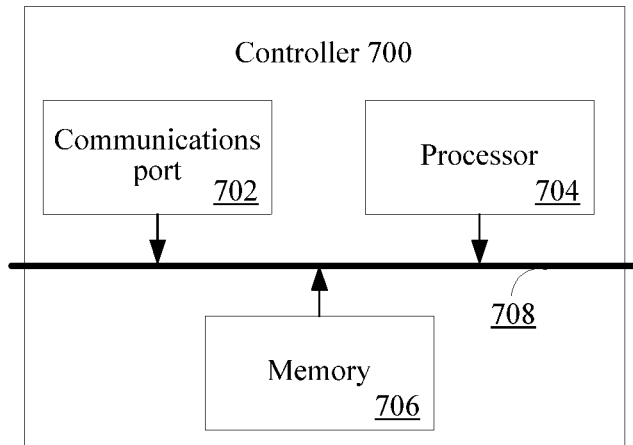
FIG. 7 is a schematic structural diagram of a controller according to an embodiment of the application.

Corresponding to the method shown in FIG. 2, FIG. 7 is a schematic structural diagram of a controller 700 according to an embodiment of the application.

The controller 700 may be a micro processing computer. For example, the controller 700 may be one of a general-purpose computer, a customized machine, a mobile phone terminal, a tablet, or other portable devices. The controller 700 includes a processor 704, a memory 706, a communications interface 702, and a bus 708. The processor 704, the memory 706, and the communications interface 702 are connected and communicate with each other by using the bus 708.

The bus 708 may be an Industry Standard Architecture (ISA) bus, a Peripheral Component Interconnect (PCI) bus, an Extended Industry Standard Architecture (EISA) bus, or the like. The bus may be classified into one or more of an address bus, a data bus, a control bus, or the like. For convenience of denotation, the bus 708 is represented by using only one bold line in FIG. 7. However, this does not indicate that there is only one bus or only one type of bus.

The memory 706 is a non-transitory computer readable medium configured to store executable program code, where the program code includes a computer operation instruction. When the controller 700 executes the program code, the controller 700 may complete steps 201 to 206 in the embodiment in FIG. 2, or may implement all functions of the controller 600 in the embodiment in FIG. 6. The memory 706 may include a high speed RAM (Ramdom Access Memory) memory. Optionally, the memory 706 may further include a non-volatile memory (non-volatile memory). For example, the memory 706 may include a magnetic disk storage.

The processor 704 may be a central processing unit (CPU), or the processor 704 may be an application-specific integrated circuit (ASIC), or the processor 704 may be configured as one or more integrated circuits implementing an embodiment of the application.

The processor 704 is configured to perform all operations performed by the processing unit 604 of the controller 600 shown in FIG. 6, and details are not described herein again.

The communications interface 702 is configured to perform all operations performed by the communications unit 602 of the controller 600 shown in FIG. 6, and details are not described herein again.

Figure 8:
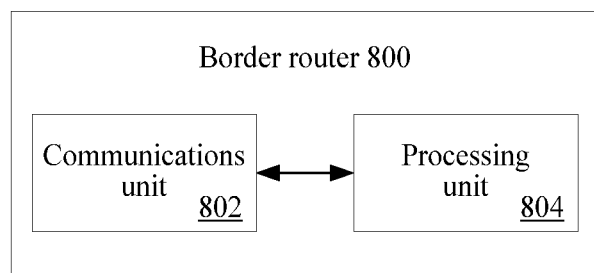
FIG. 8 is a schematic structural diagram of a border router according to an embodiment of the application.

Corresponding to the method shown in FIG. 5, FIG. 8 is a schematic structural diagram of a border router 800 according to an embodiment of the application. The border router 800 is used as a specified border router BR, and the specified border router 800 includes a communications unit 802, configured to receive a routing control message from a controller, where the routing control message is used to instruct the specified BR to use, when advertising a BGP routing message to a second AS, a first BR as a next hop for packet forwarding of a second BR, the first BR belongs to a first AS, the second BR belongs to the second AS, and the controller is configured to manage the first AS, and a processing unit 804, configured to process, according to the routing control message, the BGP routing message advertised to the second AS.

Optionally, the routing control message may have multiple specific forms, and the routing control message has multiple possible control manners. This is the same as the embodiment shown in FIG. 5. For details, refer to a related part in FIG. 5. Details are not described herein again. Corresponding to the embodiment shown in FIG. 5, the following describes specific operations performed by the processing unit 804 in two possible control manners of the routing control message.

When the control manner in Manner 1 in the embodiment shown in FIG. 5 is used, the processing, by the processing unit 804 according to the routing control message, the BGP routing message advertised to the second AS specifically includes matching, by the processing unit 804, an identifier of the specified BR and an identifier of a destination BR with a neighbor pair when the communications unit 802 advertises the BGP routing message to the destination BR in the second AS, and if the matching succeeds, not performing an operation of increasing an AS quantity in an AS-path attribute value carried in the BGP routing message, or if the matching fails, performing an operation of increasing an AS quantity in an AS-path attribute value, where the destination BR is a BR in the second AS.

Further, optionally, the communications unit 802 is further configured to send the BGP routing message to the destination BR.

When the control manner in Manner 2 in the embodiment shown in FIG. 5 is used, the processing, by the processing unit 804 according to the routing control message, the BGP routing message advertised to the second AS specifically includes matching, by the processing unit 804, an identifier of the specified BR and an identifier of a destination BR with each of at least one neighbor pair when the communications unit 802 advertises the BGP routing message to the destination BR in the second AS, and if the matching succeeds, performing an operation of increasing an AS quantity in an AS-path attribute value, or if the matching fails, not performing an operation of increasing an AS quantity in an AS-path attribute value, where the destination BR is a BR in the second AS.

Further, optionally, the communications unit 802 is further configured to send the BGP routing message to the destination BR.

Figure 9:
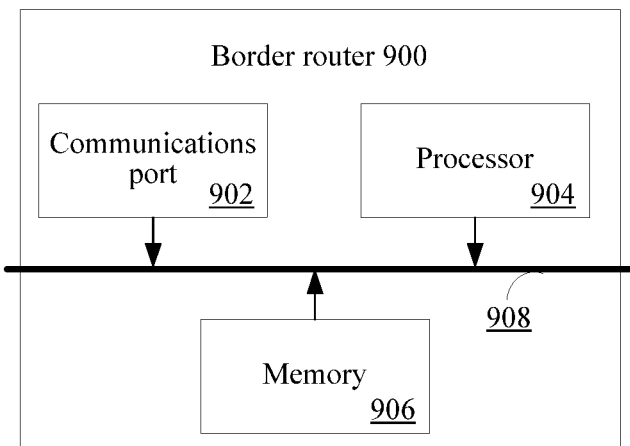
FIG. 9 is a schematic structural diagram of a border router according to an embodiment of the application.

Corresponding to the method shown in FIG. 5, FIG. 9 is a schematic structural diagram of a border router 900 according to an embodiment of the application.

The border router 900 may be a micro processing computer. For example, the border router 900 may be one of a general-purpose computer, a customized machine, a mobile phone terminal, a tablet, or other portable devices. The border router 900 includes a processor 904, a memory 906, a communications interface 902, and a bus 908. The processor 904, the memory 906, and the communications interface 902 are connected and communicate with each other by using the bus 908.

The bus 908 may be an Industry Standard Architecture (ISA) bus, a Peripheral Component Interconnect (PCI) bus, an Extended Industry Standard Architecture (EISA) bus, or the like. The bus may be classified into one or more of an address bus, a data bus, a control bus, or the like. For convenience of denotation, the bus 908 is represented by using only one bold line in FIG. 9. However, this does not indicate that there is only one bus or only one type of bus.

The memory 906 is configured to store executable program code, where the program code includes a computer operation instruction. When the border router 900 executes the program code, the border router 900 may complete step 501 and step 502 in the embodiment in FIG. 5, or may implement all functions of the border router 800 in the embodiment in FIG. 8. The memory 906 may include a high speed RAM (Ramdom Access Memory) memory. Optionally, the memory 906 may further include a non-volatile memory (non-volatile memory). For example, the memory 906 may include a magnetic disk storage.

The processor 904 may be a central processing unit (CPU), or the processor 904 may be an application-specific integrated circuit (ASIC), or the processor 904 may be configured as one or more integrated circuits implementing an embodiment of the application.

The processor 904 is configured to perform all operations performed by the processing unit 804 of the controller 800 shown in FIG. 8, and details are not described herein again.

The communications interface 902 is configured to perform all operations performed by the communications unit 802 of the controller 800 shown in FIG. 8, and details are not described herein again.

Figure 18:
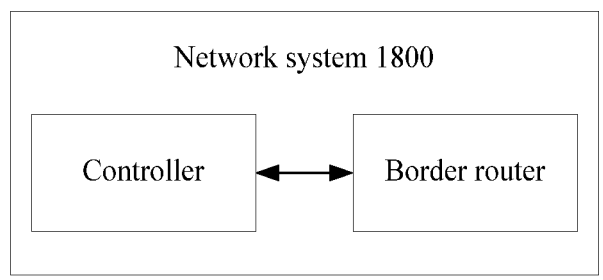
FIG. 18 is a schematic diagram of a network system according to an embodiment of the application.

FIG. 18 shows a network system 1800 provided in an embodiment of the application. The network system 1800 includes the controller 600 provided in the embodiment shown in FIG. 6 and the border router 800 provided in the embodiment shown in FIG. 8.

Alternatively, the network system 1800 includes the controller 700 provided in the embodiment shown in FIG. 7 and the border router 900 provided in the embodiment shown in FIG. 9.

2. Outgoing-Traffic Routing Control Method, Apparatus, and System

The outgoing-traffic routing control method in the embodiments of the application includes processing on a controller side and a border router side. The following provides descriptions separately.

Figure 10:
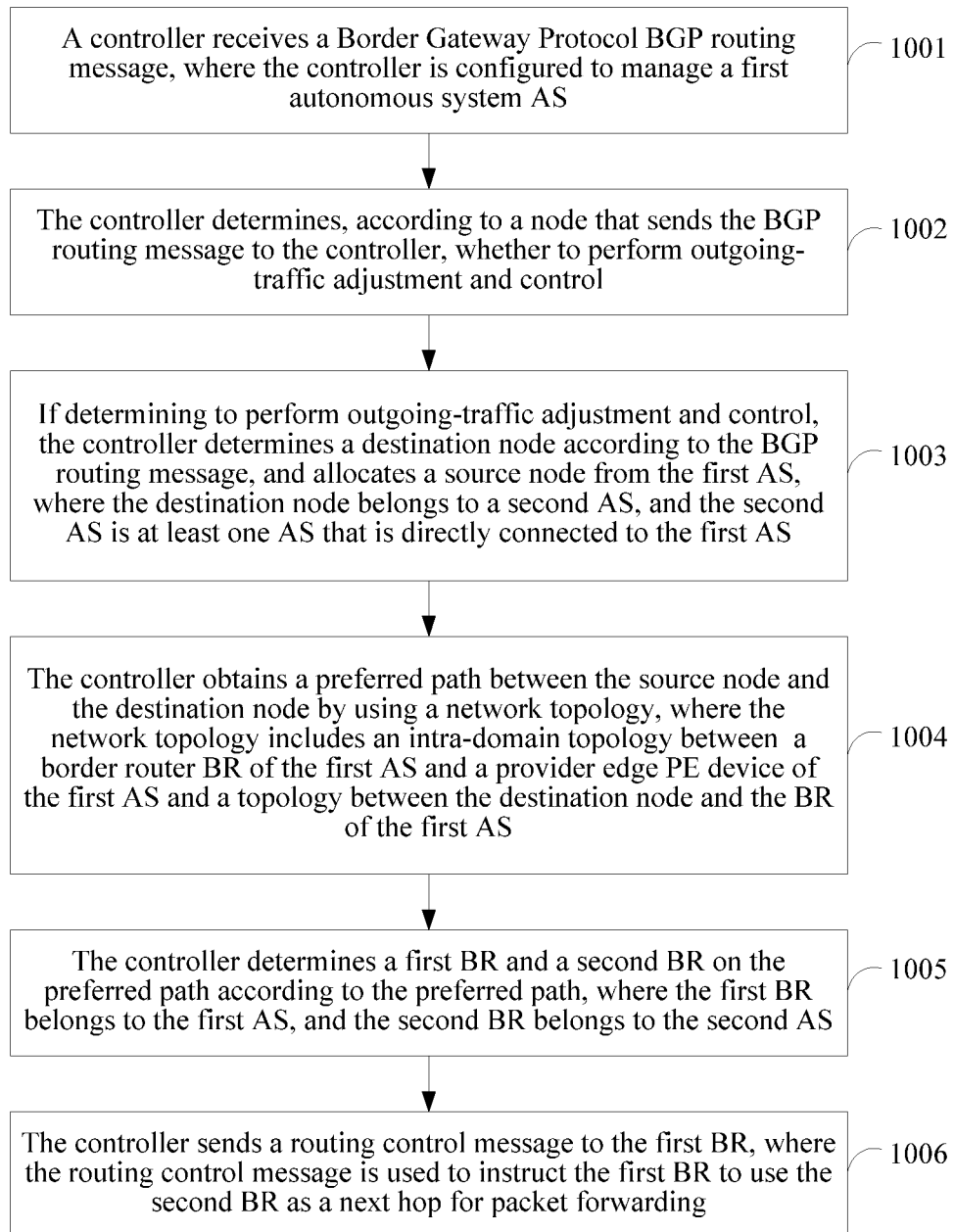
FIG. 10 is a simplified schematic diagram of a routing control method on a controller side according to an embodiment of the application.

FIG. 10 is a simplified flowchart of a routing control method on a controller side according to an embodiment of the application. If the method is applied to a network scenario similar to that shown in FIG. 1, the method includes the operations described below. It should be noted that the method shown in FIG. 10 not only can be applied to a network structure shown in FIG. 1 but also can be applied to another type of network system, for example, a network system constituted by a network device that does not use any replaceable component.

1001: A controller receives a Border Gateway Protocol BGP routing message, where the controller is configured to manage a first autonomous system AS.

1002: The controller determines, according to a node that sends the BGP routing message to the controller, whether to perform outgoing-traffic adjustment and control.

Optionally, there are the following several possible manners in which the controller determines to perform outgoing-traffic adjustment and control.

Manner 1: The controller performs outgoing-traffic adjustment and control if the controller determines that the node that sends the BGP routing message to the controller is a BR of the first AS.

With reference to the example in FIG. 1, the node that sends the first BGP routing message to the controller may be the border router BR100-1, the border router BR100-2, or the border router BR100-3. All these devices are border routers of the AS1. When receiving the first BGP routing message sent from these border routers of the AS1, the controller 130 determines to perform outgoing-traffic adjustment and control. This is a manner of random adjustment and control performed according to a node role.

Manner 2: The controller searches a first configuration information table by using the node that sends the BGP routing message to the controller, as a first match item, to obtain an operation corresponding to the first match item, where the obtained operation is performing outgoing-traffic adjustment and control.

With reference to the example in FIG. 1, for example, if the node that sends the first BGP routing message to the controller is the border router BR100-1, the controller 130 searches, by using an identifier of the border router BR100-1 as a match item, a configuration information table shown in Table 5, to obtain an operation manner that is outgoing-traffic adjustment and control. This is a type of coarse-grained traffic adjustment and control for a node.

TABLE 5

Configuration information table

| Match item | Operation manner |
| --- | --- |
| Identifier of the border router BR100-1 | Outgoing-traffic adjustment and control |
| Identifier of the border router BR100-2 | Outgoing-traffic adjustment and control |
| Identifier of the border router BR100-3 | Outgoing-traffic adjustment and control |

Manner 3: The controller obtains a first destination prefix according to the BGP routing message.

The controller searches a second configuration information table by using the node that sends the BGP routing message to the controller and the first destination prefix as a second match item, to obtain an operation corresponding to the second match item, where the obtained operation is performing outgoing-traffic adjustment and control.

With reference to the example in FIG. 1, for example, if the node that sends the first BGP routing message to the controller 130 is the border router BR100-1, and a destination prefix obtained by the controller 130 from the first BGP routing message is the prefix 2 (for example, an IP address prefix 20.1.0.0/16 or an IP address 20.1.1.1/32; the prefix 2 is a prefix of a routing destination in a network, and is further used to identify the virtual node 210-1 in this embodiment of the application), the controller 130 searches, by using an identifier (which may be, for example, an IP address) of the border router BR100-1 and the prefix 2 as a match item, a configuration information table shown in Table 6, to obtain an operation manner that is outgoing-traffic adjustment and control. This is a fine-grained traffic adjustment and control manner for a node and a prefix.

TABLE 6

Configuration information table

| Match item | | Operation manner |
| --- | --- | --- |
| Device identifier | Destination prefix | |
| Identifier of the border router BR100-1 | Prefix 2 | Incoming-traffic adjustment and control |
| Identifier of the border router BR100-2 | Prefix 2 | Incoming-traffic adjustment and control |
| Identifier of the border router BR100-3 | Prefix 3 | Incoming-traffic adjustment and control |

1003: If determining to perform outgoing-traffic adjustment and control, the controller determines a destination node according to the BGP routing message, and allocates a source node from the first AS, where the destination node belongs to a second AS, and the second AS is at least one AS that is directly connected to the first AS.

Optionally, a manner of allocating the source node from the first AS may be as follows.

Manner 1: The controller determines the node that sends the BGP routing message to the controller, as the source node, or the controller determines a border network device of the first AS as the source node, where the border network device is a BR device or a provider edge PE device.

With reference to the example in FIG. 1, for example, if the node that sends the first BGP routing message to the controller 130 is the border router BR100-1, the BR100-1 is determined as the source node, or with reference to the example in FIG. 1, the border network device of the first AS includes the border router BR100-1, the border router BR100-2, the border router BR100-3, the PE device 110-1, and the PE device 110-2, and the source node is selected from these border network devices.

It should be noted that the source node may alternatively be selected from a P device in a domain of the first AS. This is not limited herein.

Manner 2: The controller searches a first configuration information table by using the node that sends the first BGP routing message to the controller, as a first match item, to obtain a source node corresponding to the first match item, as the source node.

With reference to the example in FIG. 1, for example, if the node that sends the first BGP routing message to the controller is the border router BR100-1, the controller 130 searches, by using the identifier of the border router BR100-1 as a match item, a configuration information table shown in Table 7, to obtain a source node that is the border router BR100-1.

TABLE 7

Configuration information table

| Match item | Source node |
| --- | --- |
| Identifier of the border router BR100-1 | Identifier of the border router BR100-1 |
| Identifier of the border router BR100-2 | Identifier of the border router BR100-1 |
| Identifier of the border router BR100-3 | Identifier of the border router BR100-2 |

Manner 3: The controller obtains a first destination prefix according to the first BGP routing message.

The controller searches a second configuration information table by using the node that sends the first BGP routing message to the controller and the first destination prefix as a second match item, to obtain a source node corresponding to the second match item, as the source node.

With reference to the example in FIG. 1, for example, if the node that sends the first BGP routing message to the controller 130 is the border router BR100-1, and a destination prefix obtained by the controller 130 from the first BGP routing message is the prefix 2 (for example, the IP address prefix 20.1.0.0/16 or the IP address 20.1.1.1/32; the prefix 2 is a prefix of a routing destination in a network, and is further used to identify the virtual node 210-1 in this embodiment of the application), the controller 130 searches, by using the identifier (which may be, for example, the IP address) of the border router BR100-1 and the prefix 2 as a match item, a configuration information table shown in Table 8, to obtain a source node that is the border router BR100-1.

TABLE 8

Configuration information table

| Match item | | Source node |
| --- | --- | --- |
| Device identifier | Destination prefix | |
| Identifier of the border router BR100-1 | Prefix 2 | Identifier of the border router BR100-1 |
| Identifier of the border router BR100-2 | Prefix 2 | Identifier of the border router BR100-1 |
| Identifier of the border router BR100-3 | Prefix 3 | Identifier of the border router BR100-3 |

1004: The controller obtains a preferred path between the source node and the destination node by using a network topology, where the network topology includes an intra-domain topology of the first AS and an inter-domain topology between BRs of the first AS and the second AS.

Optionally, the intra-domain topology of the first AS may include multiple cases. This is the same as related descriptions in the embodiment shown in FIG. 2, and details are not described herein again.

Optionally, a manner of determining the destination node and determining the inter-domain topology between the BRs of the first AS and the second AS may be as follows.

Manner 1: If a BR in the second AS is determined as the destination node, the inter-domain topology between the BRs of the first AS and the second AS includes an inter-domain topology between a BR of the first AS and a BR of the second AS.

With reference to the example in FIG. 1, the inter-domain topology includes the BR200-1, the BR200-2, the BR100-1, the BR100-2, and a link that connects these nodes.

Manner 2: If the destination node is a virtual node that is set in the second AS, the inter-domain topology between the BRs of the first AS and the second AS includes an inter-domain topology between a BR of the first AS and a BR of the second AS, and a topology between the destination node and the BR of the second AS.

With reference to the example in FIG. 1, the inter-domain topology includes the BR200-1, the BR200-2, the BR100-1, the BR100-2, and a link that connects these nodes. The inter-domain topology further includes the virtual node 210-1, a virtual link between the virtual node 210-1 and the BR200-1, and a virtual link between the virtual node 210-1 and the BR200-2.

Optionally, a manner in which the controller obtains the inter-domain topology may be as follows.

Manner 1: The controller establishes a link between a BR that is identified by a next-hop field included in the BGP routing message and the node that sends the BGP routing message to the controller, to obtain the inter-domain topology, where the BR identified by the next-hop field belongs to the second AS, or the controller establishes a link between a BR that is identified by a community attribute field included in the BGP routing message and the node that sends the BGP routing message to the controller, to obtain the inter-domain topology, where the BR identified by the community attribute field belongs to the second AS.

Manner 2: The controller obtains a direct route of the BR of the first AS by using an Interior Gateway Protocol IGP routing message. The controller determines whether the obtained direct route and a link identifier are stored in a match item of a link information configuration table. If determining that the obtained direct route and the link identifier are stored in the match item of the link information configuration table, the controller establishes the inter-domain topology between the first AS and the second AS according to the link identifier.

Correspondingly, the obtaining, by the controller, a preferred path between the source node and the destination node by using a network topology includes obtaining, by the controller, an affinity attribute constraint condition according to a link between the node that sends the BGP routing message to the controller and the BR of the second AS; and obtaining, by the controller, the preferred path by using the network topology and the affinity attribute constraint condition.

With reference to the example in FIG. 1, the preferred path is a path of outgoing data traffic from the BR100-1, through the BR200-1, to the virtual node 210-1.

Figure 11A:
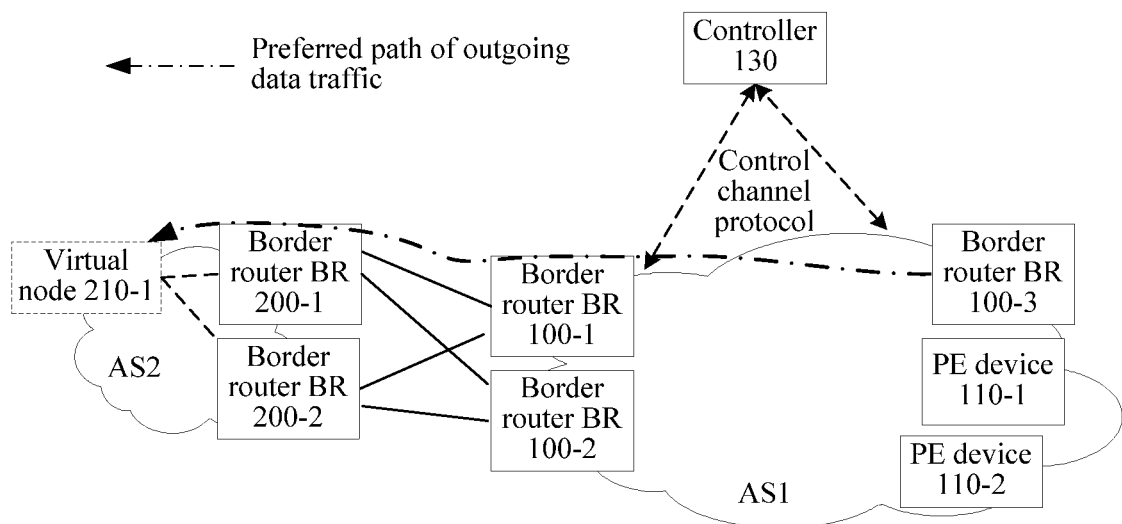
FIG. 11a and FIG. 11b are schematic network diagrams of outgoing-traffic control according to an embodiment of the application.

It should be noted that, as shown in FIG. 11*a*, the source node may alternatively be the BR100-3 in the AS1, and the preferred path is a path of outgoing data traffic from the BR100-3, through the BR100-1 and the BR200-1, to the virtual node 210-1.

Figure 11B:
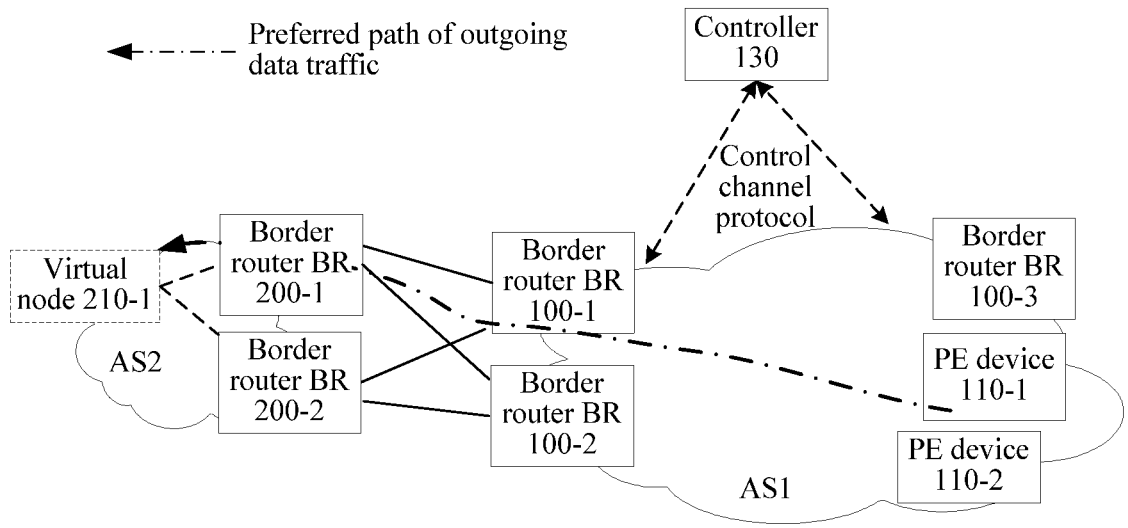

As shown in FIG. 11*b*, the source node may alternatively be the PE device 110-1 in the AS1, and the preferred path is a path of outgoing data traffic from the PE device 110-1, through the BR100-1 and the BR200-1, to the virtual node 210-1.

It should be noted that there may also be a P device in an AS1 domain. In a possible scenario, the P device in the AS1 domain may also be included on the preferred path.

1005: The controller determines a first BR and a second BR on the preferred path according to the preferred path, where the first BR belongs to the first AS, and the second BR belongs to the second AS.

With reference to the example in FIG. 1, the first BR is the BR100-1, and the second BR is the BR200-1.

1006: The controller sends a routing control message to the first BR, where the routing control message is used to instruct the first BR to use the second BR as a next hop for packet forwarding.

Optionally, the routing control message includes a destination prefix, an identifier of the second BR, and an operation manner, the operation manner instructs the first BR to use the second BR as a next hop for routing to the destination prefix, and the destination prefix is obtained from the BGP routing message.

The routing control message may have multiple specific forms, and may be an extended BGP update update message. Specifically, the routing control message may alternatively be a BGP FLOWSPEC message, or may be an extended OpenFlow OpenFlow protocol of software-defined networking SDN.

The following uses the extended BGP update message as an example for description. The function may be implemented by adding a new BGP policy attribute. As shown in FIG. 12, the newly added BGP policy attribute includes a match field and an action field.

The match field includes a match type field, a sub-type length value sub-TLV quantity field, and a sub-TLV field. A possible value of the match type field is 0 (indicating permission) or 1 (indicating rejection). With reference to the example of outgoing-traffic adjustment and control in FIG. 1, a value of the match type field is 0, indicating permission.

The sub-type length value sub-TLV quantity field indicates a quantity of sub-TLVs carried in the match field, and a value of the sub-type length value sub-TLV quantity field may be a positive integer greater than or equal to 0. With reference to the example of outgoing-traffic adjustment and control in FIG. 1, the value of the sub-TLV quantity field is 1.

The sub-TLV field includes a sub-type sub-type field, a sub-length sub-length field, and a sub-value sub-value field. A possible value of the sub-type sub-type field is as follows. Sub-type=1, instructing to match an IPv4 neighbor pair, that is, a neighbor pair in which each device identifier is identified by using an IPv4 address, or sub-type=2, instructing to match an IPv6 neighbor pair, that is, a neighbor pair in which each device identifier is identified by using an IPv6 address.

The sub-length field indicates a length of the sub-TLV or a length of the sub-value field. The sub-value field includes a neighbor pair constituted by a neighbor local device identifier field and a neighbor peer device identifier field. With reference to the example of outgoing-traffic adjustment and control in FIG. 1, the neighbor local device identifier field carries an identifier (BR100-1) of the first BR, and the neighbor peer device identifier field carries an identifier (BR200-2) of the second BR.

The action field includes an action type field, an action length field, and an action value field. A possible value of the action type (Action Type) field includes but is not limited to the following. Action type=1, instructing to perform a preferred-routing operation, or action type=2, instructing to perform an operation of increasing an AS-path (AS-Path) length.

With reference to the example of outgoing-traffic adjustment and control in FIG. 1, action type=1, instructing to perform the preferred-routing operation.

The action length field indicates a length of the action field or a length of the action value field. In this case, the action value field has no meaning, and specifically, may be empty, or carry an invalid value, or not exist.

The BGP policy attribute instructs the first BR to perform matching between the identifier of the first BR and the neighbor local device identifier field in the neighbor pair field, and if the matching succeeds, to perform an operation of using the second BR as the next hop for routing to the destination prefix.

It should be noted that multiple formats may be used for the routing control message. The format shown in FIG. 12 is merely a specific example. However, an application and a message format that are described herein are not limited to disclosed specific forms. Instead, this disclosure covers all modifications, equivalents, and replacements falling within the scope of the accompanying claims.

It can be learned from the foregoing embodiment that, according to the solution in this embodiment, the controller receives the first BGP routing message, then automatically determines to perform outgoing-traffic control, calculates the preferred path from the source node to the destination node, obtains the first BR and the second BR on the preferred path, sends the routing control message to the first BR in the first AS controlled by the controller, and instructs the first BR to use the second BR as the next hop for packet forwarding. Therefore, compared with a prior-art method in which configuration is manually performed one by one, this method facilitates automatic and flexible adjustment and control of data traffic flowing out of the first AS, simplifies configuration, and saves human power.

FIG. 13 is a simplified flowchart of a routing control method on a border router side according to an embodiment of the application. If the method is applied to a network scenario similar to that shown in FIG. 1, the method includes the operations described below. It should be noted that the method shown in FIG. 13 not only can be applied to a network structure shown in FIG. 1, but also can be applied to another type of network system, for example, a network system constituted by a network device that does not use any replaceable component.

1301: A first border router BR in a first AS receives a routing control message from a controller, where the routing control message is used to instruct the first BR to use a second BR as a next hop for packet forwarding, and the second BR belongs to a second AS.

1302: The first BR determines, according to the routing control message, the second BR as the next hop for packet forwarding.

It should be noted that the embodiment shown in FIG. 13 is corresponding to the routing control method on the controller side. Descriptions of the routing control message are the same as those in the embodiment shown in FIG. 10, and details are not described herein again.

It can be learned from the foregoing embodiment that, according to the solution in this embodiment, the first BR in the first AS receives the routing control message from the controller, and determines, according to the routing control message, the second BR as the next hop for packet forwarding of the first BR. Therefore, compared with a prior-art method in which BR configuration is manually performed one by one, this method facilitates automatic and flexible adjustment and control of data traffic flowing out of the first AS, simplifies configuration, and saves human power.

Corresponding to the method shown in FIG. 10, FIG. 14 is a schematic structural diagram of a controller 1400 according to an embodiment of the application. The controller 1400 is configured to manage a first autonomous system AS, and the controller 1400 includes a communications unit 1402, configured to receive a Border Gateway Protocol BGP routing message, and a processing unit 1404, configured to determine, according to a node that sends the BGP routing message to the controller, whether to perform outgoing-traffic adjustment and control.

If determining to perform outgoing-traffic adjustment and control, the processing unit 1404 is further configured to determine a destination node according to the BGP routing message, and allocate a source node from the first AS, where the destination node belongs to a second AS, and the second AS is at least one AS that is directly connected to the first AS.

The processing unit 1404 is further configured to obtain a preferred path between the source node and the destination node by using a network topology, where the network topology includes an intra-domain topology of the first AS and an inter-domain topology between BRs of the first AS and the second AS.

The processing unit 1404 is further configured to determine a first BR and a second BR on the preferred path according to the preferred path, where the first BR belongs to the first AS, and the second BR belongs to the second AS.

The processing unit 1404 is further configured to send a routing control message to the first BR, where the routing control message is used to instruct the first BR to use the second BR as a next hop for packet forwarding.

Optionally, there may be the following manners of determining, according to the node that sends the BGP routing message to the controller, whether to perform outgoing-traffic adjustment and control.

Manner 1: The processing unit 1404 is further configured to perform outgoing-traffic adjustment and control if determining that the node that sends the BGP routing message to the controller is a BR of the first AS.

Manner 2: The processing unit 1404 is further configured to search a first configuration information table by using the node that sends the BGP routing message to the controller, as a first match item, to obtain an operation corresponding to the first match item, where the obtained operation is performing outgoing-traffic adjustment and control.

Manner 3: The processing unit 1404 is further configured to obtain a first destination prefix according to the BGP routing message.

The processing unit 1404 is further configured to search a second configuration information table by using the node that sends the BGP routing message to the controller and the first destination prefix as a second match item, to obtain an operation corresponding to the second match item, where the obtained operation is performing outgoing-traffic adjustment and control.

Further, optionally, a manner of allocating the source node from the first AS may be as follows the processing unit 1404 is further configured to search a first configuration information table by using the node that sends the first BGP routing message to the controller, as a first match item, to obtain a source node corresponding to the first match item, as the source node, or obtaining, by the processing unit 1404, a first destination prefix according to the first BGP routing message, and searching, by the processing unit 1404, a second configuration information table by using the node that sends the first BGP routing message to the controller and the first destination prefix as a second match item, to obtain a source node corresponding to the second match item, as the source node.

Further, optionally, a manner of determining the destination node and determining the inter-domain topology between the BRs of the first AS and the second AS may be as follows.

If the destination node is a BR in the second AS, the inter-domain topology between the BRs of the first AS and the second AS includes an inter-domain topology between a BR of the first AS and a BR of the second AS.

If the destination node is a virtual node that is set in the second AS, the inter-domain topology between the BRs of the first AS and the second AS includes an inter-domain topology between a BR of the first AS and a BR of the second AS, and a topology between the destination node and the BR of the second AS.

Further, optionally, a manner in which the controller obtains the inter-domain topology is the following.

Manner 1: The processing unit 1404 is further configured to establish a link between a BR that is identified by a next-hop field included in the BGP routing message and the node that sends the BGP routing message to the controller, to obtain the inter-domain topology, where the BR identified by the next-hop field belongs to the second AS; or the processing unit 1404 is further configured to establish a link between a BR that is identified by a community attribute field included in the BGP routing message and the node that sends the BGP routing message to the controller, to obtain the inter-domain topology, where the BR identified by the community attribute field belongs to the second AS.

Manner 2: The processing unit 1404 is further configured to obtain a direct route of the BR of the first AS by using an Interior Gateway Protocol IGP routing message.

The processing unit 1404 is further configured to determine whether the obtained direct route and a link identifier are stored in a match item of a link information configuration table.

If determining that the obtained direct route and the link identifier are stored in the match item of the link information configuration table, the processing unit 1404 is further configured to establish the inter-domain topology between the first AS and the second AS according to the link identifier.

Correspondingly, that the processing unit 1404 is further configured to obtain a preferred path between the source node and the destination node by using a network topology includes obtaining, by the processing unit, an affinity attribute constraint condition according to a link between the node that sends the BGP routing message to the controller and the BR of the second AS; and obtaining, by the processing unit, the preferred path by using the network topology and the affinity attribute constraint condition.

Further, optionally, the routing control message includes a destination prefix, an identifier of the second BR, and an operation manner, the operation manner instructs the first BR to use the second BR as a next hop for routing to the destination prefix, and the destination prefix is obtained from the BGP routing message.

It should be noted that descriptions of the routing control message in this embodiment are the same as those in the method embodiment shown in FIG. o0, and details are not described herein again.

Figure 15:
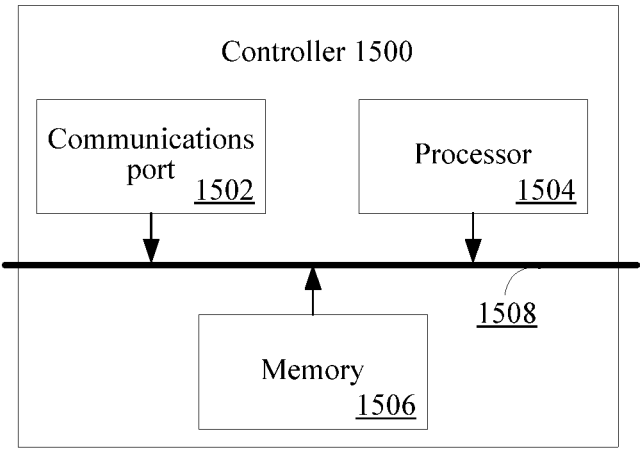
FIG. 15 is a schematic structural diagram of a controller according to an embodiment of the application.

Corresponding to the method shown in FIG. o0, FIG. 15 is a schematic structural diagram of a controller 1500 according to an embodiment of the application.

The controller 1500 may be a micro processing computer. For example, the controller 1500 may be one of a general-purpose computer, a customized machine, a mobile phone terminal, a tablet, or other portable devices. The controller 1500 includes a processor 1504, a memory 1506, a communications interface 1502, and a bus 1508. The processor 1504, the memory 1506, and the communications interface 1502 are connected and communicate with each other by using the bus 1508.

The bus 1508 may be an Industry Standard Architecture (ISA) bus, a Peripheral Component Interconnect (PCI) bus, an Extended Industry Standard Architecture (EISA) bus, or the like. The bus may be classified into one or more of an address bus, a data bus, a control bus, or the like. For convenience of denotation, the bus 1508 is represented by using only one bold line in FIG. 15. However, this does not indicate that there is only one bus or only one type of bus.

The memory 1506 is configured to store executable program code, where the program code includes a computer operation instruction. When the controller 1500 executes the program code, the controller 1500 may complete steps 1001 to 1006 in the embodiment in FIG. o0, or may implement all functions of the controller 1400 in the embodiment in FIG. 14. The memory 1506 may include a high speed RAM (Ramdom Access Memory) memory. Optionally, the memory 1506 may further include a non-volatile memory (non-volatile memory). For example, the memory 1506 may include a magnetic disk storage.

The processor 1504 may be a central processing unit (CPU), or the processor 1504 may be an application-specific integrated circuit (ASIC), or the processor 1504 may be configured as one or more integrated circuits implementing an embodiment of the application.

The processor 1504 is configured to perform all operations performed by the processing unit 1404 of the controller 1400 shown in FIG. 14, and details are not described herein again.

The communications interface 1502 is configured to perform all operations performed by the communications unit 1402 of the controller 1400 shown in FIG. 14, and details are not described herein again.

Figure 16:
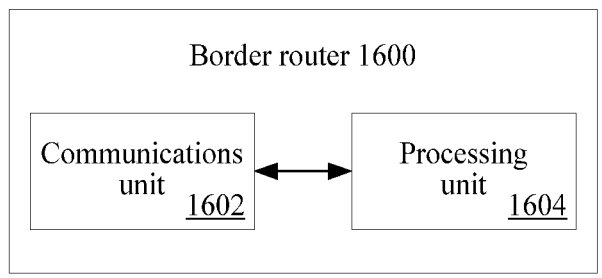
FIG. 16 is a schematic structural diagram of a border router according to an embodiment of the application.

Corresponding to the method shown in FIG. 13, FIG. 16 is a schematic structural diagram of a network device 1600 according to an embodiment of the application. The network device 1600 is used as a first border router BR, and the first border router 1600 includes a communications unit 1602, configured to receive a routing control message from a controller, where the routing control message is used to instruct the first BR to use a second BR as a next hop for packet forwarding, and the second BR belongs to a second AS, and a processing unit 1604, configured to determine, according to the routing control message, the second BR as the next hop for packet forwarding.

Optionally, the routing control message includes a destination prefix, an identifier of the second BR, and an operation manner, the operation manner instructs the first BR to use the second BR as a next hop for routing to the destination prefix, and the destination prefix is obtained from a BGP routing message.

Correspondingly, the processing unit 1604 sets the next hop for routing to the destination prefix to the second BR.

It should be noted that the routing control message may have multiple specific forms. Descriptions of the routing control message are the same as those in the embodiments shown in FIG. 13 and FIG. 10. For details, refer to related parts in FIG. 13 and FIG. o0. Details are not described herein again.

Figure 17:
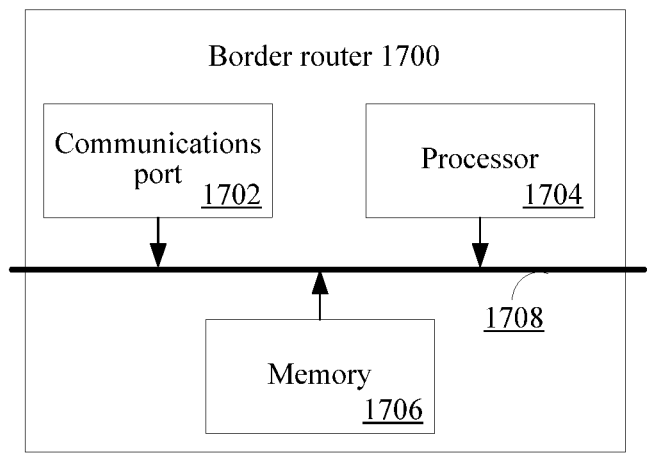
FIG. 17 is a schematic structural diagram of a border router according to an embodiment of the application.

Corresponding to the method shown in FIG. 13, FIG. 17 is a schematic structural diagram of a border router 1700 according to an embodiment of the application.

The border router 1700 may be a micro processing computer. For example, the border router 1700 may be one of a general-purpose computer, a customized machine, a mobile phone terminal, a tablet, or other portable devices. The border router 1700 includes a processor 1704, a memory 1706, a communications interface 1702, and a bus 1708. The processor 1704, the memory 1706, and the communications interface 1702 are connected and communicate with each other by using the bus 1708.

The bus 1708 may be an Industry Standard Architecture (ISA) bus, a Peripheral Component Interconnect (PCI) bus, an Extended Industry Standard Architecture (EISA) bus, or the like. The bus may be classified into one or more of an address bus, a data bus, a control bus, or the like. For convenience of denotation, the bus 1708 is represented by using only one bold line in FIG. 17. However, this does not indicate that there is only one bus or only one type of bus.

The memory 1706 is configured to store executable program code, where the program code includes a computer operation instruction. When the border router 1700 executes the program code, the border router 1700 may complete step 1301 and step 1302 in the embodiment in FIG. 13, or may implement all functions of the border router 1600 in the embodiment in FIG. 16. The memory 1706 may include a high speed RAM (Ramdom Access Memory) memory. Optionally, the memory 1706 may further include a non-volatile memory (non-volatile memory). For example, the memory 1706 may include a magnetic disk storage.

The processor 1704 may be a central processing unit (CPU), or the processor 1704 may be an application-specific integrated circuit (ASIC), or the processor 1704 may be configured as one or more integrated circuits implementing an embodiment of the application.

The processor 1704 is configured to perform all operations performed by the processing unit 1604 of the controller 1600 shown in FIG. 16, and details are not described herein again.

Figure 19:
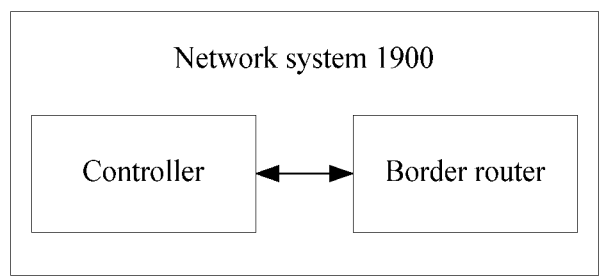
FIG. 19 is a schematic diagram of another network system according to an embodiment of the application.

FIG. 19 shows a network system 1900 provided in an embodiment of the application. The network system 1900 includes the controller 1400 provided in the embodiment shown in FIG. 14 and the border router 1600 provided in the embodiment shown in FIG. 16.

Alternatively, the network system 1800 includes the controller 1500 provided in the embodiment shown in FIG. 15 and the border router 1700 provided in the embodiment shown in FIG. 17.

Finally, it should be noted that the foregoing embodiments are used merely as examples for describing the technical solutions of the application, but are not intended to limit the application. Each feature disclosed in the specification and, in a proper situation, in the claims and the accompanying drawings may be provided independently or be provided in any proper combination. A feature described as being implemented by hardware may alternatively be implemented by software, and vice versa. Although the application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of the application.

What is claimed is:

1. A controller, comprising:
 a processor configured to:
  determine a first border router (BR) and a second BR, wherein the first BR belongs to a first autonomous system (AS) and belongs to an inter-domain topology between BRs of the first AS and a second AS, and the second BR belongs to the second AS and belongs to the inter-domain topology; and
 a communications interface configured to send a routing control message to the first BR, wherein the routing control message comprises an identifier of the second BR and an AS quantity, wherein the routing control message instructs the first BR to, when advertising a Border Gateway Protocol (BGP) routing message to the second AS, process the BGP routing message according to the identifier of second BR and the AS quantity, wherein the first BR processing the BGP routing message includes increasing the AS quantity in an AS-path attribute value carried in the BGP routing message, and wherein the routing control message is a BGP update message.

2. The controller according to claim 1, wherein the communications interface is further configured to receive a first BGP routing message from a node of the first AS;
wherein the processor is configured to determine the first BR and the second BR comprises:
wherein the processor is configured to determine a destination node according to the first BGP routing message, wherein the destination node belongs to the first AS;
wherein the processor is further configured to determine, according to the node that sends the first BGP routing message to the controller, whether to perform incoming-traffic adjustment and control;
wherein the processor is further configured to allocate a source node from a second AS in response to determining to perform incoming-traffic adjustment and control, wherein the second AS is at least one AS that is directly connected to the first AS;
wherein the processor is further configured to obtain a preferred path between the source node and the destination node by using a network topology, wherein the network topology comprises an intra-domain topology of the first AS and the inter-domain topology; and
wherein the processor is further configured to determine the first BR and the second BR on the preferred path according to the preferred path.

3. The controller according to claim 2, wherein the processor being configured to determine, according to the node that sends the first BGP routing message to the controller, whether to perform incoming-traffic adjustment and control comprises the processor being configured to:
search a first configuration information table according to the node that sends the first BGP routing message to the controller, as a first match item, to obtain an operation corresponding to the first match item, wherein the obtained operation includes performing the incoming-traffic adjustment and control.

4. The controller according to claim 2, wherein the processor being configured to determine, according to the node that sends the first BGP routing message to the controller, whether to perform incoming-traffic adjustment and control comprises the processor being configured to:
obtain, by the processor, a first destination prefix according to the first BGP routing message; and
search, by the processor, a second configuration information table according to the node that sends the first BGP routing message to the controller and the first destination prefix, as a second match item, to obtain an operation corresponding to the second match item, wherein the obtained operation includes performing incoming-traffic adjustment and control.

5. The controller according to claim 2, wherein the processor being configured to determine the destination node according to the first BGP routing message comprises the processor being configured to:

determine whether at least two first BGP routing messages are received; and
set, in response to the at least two first BGP routing messages being received, a virtual node in the first AS, and identify the virtual node as the destination node; and
wherein the intra-domain topology of the first AS further comprises a link between the destination node and the node that sends the first BGP routing message to the controller.

6. The controller according to claim 2, wherein the processor being configured to determine the destination node according to the first BGP routing message comprises the processor being configured to:
set a virtual node in the first AS, and identify the virtual node as the destination node;
wherein the intra-domain topology of the first AS further comprises a link between a border network device of the first AS and the destination node; and
wherein the processor being configured to obtain the preferred path between the source node and the destination node comprises the processor being configured to:
obtain a first affinity attribute constraint condition according to a link between the node that sends the first BGP routing message to the controller and the destination node; and
obtain the preferred path according to the network topology and the first affinity attribute constraint condition.

7. The controller according to claim 2, wherein the processor being configured to allocate the source node from the second AS comprises the processor being configured to:
determine one AS that is directly connected to the first AS to be the second AS; and
allocate the source node from the second AS.

8. The controller according to claim 2, wherein the processor being configured to allocate the source node from the second AS comprises the processor being configured to:
search a third configuration information table according to the node that sends the first BGP routing message to the controller, as a first match item, to obtain, a source node corresponding to the first match item, as the source node; or
obtain a first destination prefix according to the first BGP routing message, and search a fourth configuration information table according to the node that sends the first BGP routing message to the controller and the first destination prefix, as a second match item, to obtain a source node corresponding to the second match item, as the source node.

9. The controller according to claim 2, wherein the source node is a BR that is in the second AS and that is directly connected to the first AS, and wherein the inter-domain topology between the BRs of the first AS and the second AS comprises an inter-domain topology between a BR of the first AS and a BR of the second AS.

10. The controller according to claim 9, wherein the processor is further configured to obtain the inter domain topology, and wherein the processor being configured obtain the inter domain topology comprises the processor being configured to:
obtain a direct route of the BR of the first AS by using an Interior Gateway Protocol (IGP) routing message;
determine whether the obtained direct route and a link identifier are stored in a match item of a link information configuration table; and establish, according to the link identifier and in response to the obtained direct route and the link identifier being stored in the match item of the link information configuration table, the inter-domain topology between the first AS and an AS that is directly connected to the first AS.

11. The controller according to claim 2, wherein the source node is a virtual node that is set in the second AS, and the inter-domain topology between the BRs of the first AS and the second AS comprises an inter-domain topology between a BR of the first AS and a BR of the second AS, and further comprises a topology between the source node and the BR of the second AS.

12. The controller according to claim 2, wherein the processor being configured to determine, according to the node that sends the first BGP routing message to the controller, whether to perform incoming-traffic adjustment and control comprises the processor being configured to:
perform incoming-traffic adjustment and control in response to determining that the node that sends the first BGP routing message to the controller is a border network device of the first as, wherein the border network device of the first as is a BR device or a provider edge (PE) device.

13. The controller according to claim 1, wherein the routing control message instructs the first BR to perform matching, when advertising the BGP routing message to a destination BR in the second AS, between an identifier of the second BR and an identifier of the destination BR.

14. The controller according to claim 1, wherein the routing control message is an incoming traffic control message.

15. A border router (BR), comprising:
a communications interface, configured to:
receive a routing control message from a controller, wherein the routing control message is a Border Gateway Protocol (BGP) update message, wherein the routing control message comprises an identifier of a second BR and an autonomous system (AS) quantity, the routing control message being used to instruct the BR to, when advertising a Border Gateway Protocol (BGP) routing message to a second AS, process the BGP routing message according to the identifier of the second BR and the AS quantity, wherein the BR belongs to a first AS managed by the controller and belongs to an inter-domain topology between BRs of the first AS and the second AS, the second BR belongs to the second AS and belongs to the inter-domain topology; and;
a processor, configured to, when advertising the BGP routing message, process, according to the identifier of the second BR and the AS quantity, the BGP routing message, wherein the processing includes increasing an AS quantity in an AS-path attribute value carried in the BGP routing message.

16. The BR according to claim 15, wherein the processor being configured to, when advertising the BGP routing message to the second AS, process, according to the identifier of the second BR, the processor being configured to:
perform matching, when advertising the BGP routing message to a destination BR in the second AS, between an identifier of the second BR and an identifier of the destination BR.

17. The BR according to claim 15, wherein the routing control message comprises a match field and an action field, wherein the action field instructs the BR to add the AS quantity; and wherein the processor is configured to perform matching according to the match field before performing an action instructed by the action field.

18. A routing control method, comprising:
determining a first border router (BR) and a second BR, by a controller, wherein the first BR belongs to a first autonomous system (AS) and belongs to an inter-domain topology between BRs of the first AS and a second AS, and the second BR belongs to the second AS and belongs to the inter-domain topology; and
sending a routing control message to the first BR, by the controller, wherein the routing control message comprises an identifier of the second BR and an AS quantity, the routing control message instructs the first BR to, when advertising a Border Gateway Protocol (BGP) routing message to the second AS, process the BGP routing message according to the identifier of the second BR and the AS quantity, wherein the processing includes increasing the AS quantity in an AS-path attribute value carried in the BGP routing message, wherein the routing control message is a BGP update message.

19. The method according to claim 18, further comprising:
receiving, by the controller, a first BGP routing message from a node of the first AS;
wherein the determining the first BR and the second BR comprises:
determining, by the controller, a destination node according to the first BGP routing message, wherein the destination node belongs to the first AS;
determining, by the controller, according to the node that sends the first BGP routing message to the controller, whether to perform incoming-traffic adjustment and control;
allocating, by the controller, a source node from a second AS in response to determining to perform incoming-traffic adjustment and control, wherein the second AS is at least one AS that is directly connected to the first AS;
obtaining, by the controller, a preferred path between the source node and the destination node by using a network topology, wherein the network topology comprises an intra-domain topology of the first AS and the inter-domain topology; and
determining, by the controller, the first BR and the second BR on the preferred path according to the preferred path.

20. The method according to claim 18, wherein the routing control message instructs the first BR to perform matching, when advertising the BGP routing message to the destination node in the second AS, between an identifier of the second BR and an identifier of the destination node.

21. The method according to claim 18, the routing control message is an incoming traffic control message.

22. The method according to claim 21, wherein the routing control message comprises a match field and an action field, wherein the action field instructs the BR to add the AS quantity, and to perform matching, by the BR, according to the match field before performing and action instructed by the action field.

23. A routing control method, comprising:
receiving a routing control message from a controller, by a border router (BR), wherein the routing control message is a Border Gateway Protocol (BGP) update message, wherein the routing control message comprises an identifier of a second BR and an autonomous system (AS) quantity, the routing control message being used to instruct the BR to, when advertising a Border Gateway Protocol (BGP) routing message to a second autonomous system (AS), process the BGP routing message according to the identifier of the second BR and the AS quantity, wherein the BR belongs to a first AS managed by the controller and belongs to an inter-domain topology between BRs of the first AS and the second AS, and wherein the second BR belongs to the second AS and belongs to the inter-domain topology; and;

processing, by the BR, when advertising the BGP routing message, the BGP routing message, according to the identifier of the second BR and the AS quantity, wherein the processing includes increasing an AS quantity in an AS-path attribute value carried in the BGP routing message.

24. The method according to claim 23, wherein the processing further comprises:

performing matching, by the BR, when advertising the BGP routing message to the second AS and when advertising the BGP routing message to a destination BR in the second AS, between an identifier of the second BR and an identifier of the destination BR.

* * * * *